Dec. 16, 1958   H. F. ELLIOTT ET AL   2,864,292
TRACTOR MOUNTED PLANT THINNING MACHINE
Filed Jan. 18, 1956   13 Sheets-Sheet 1
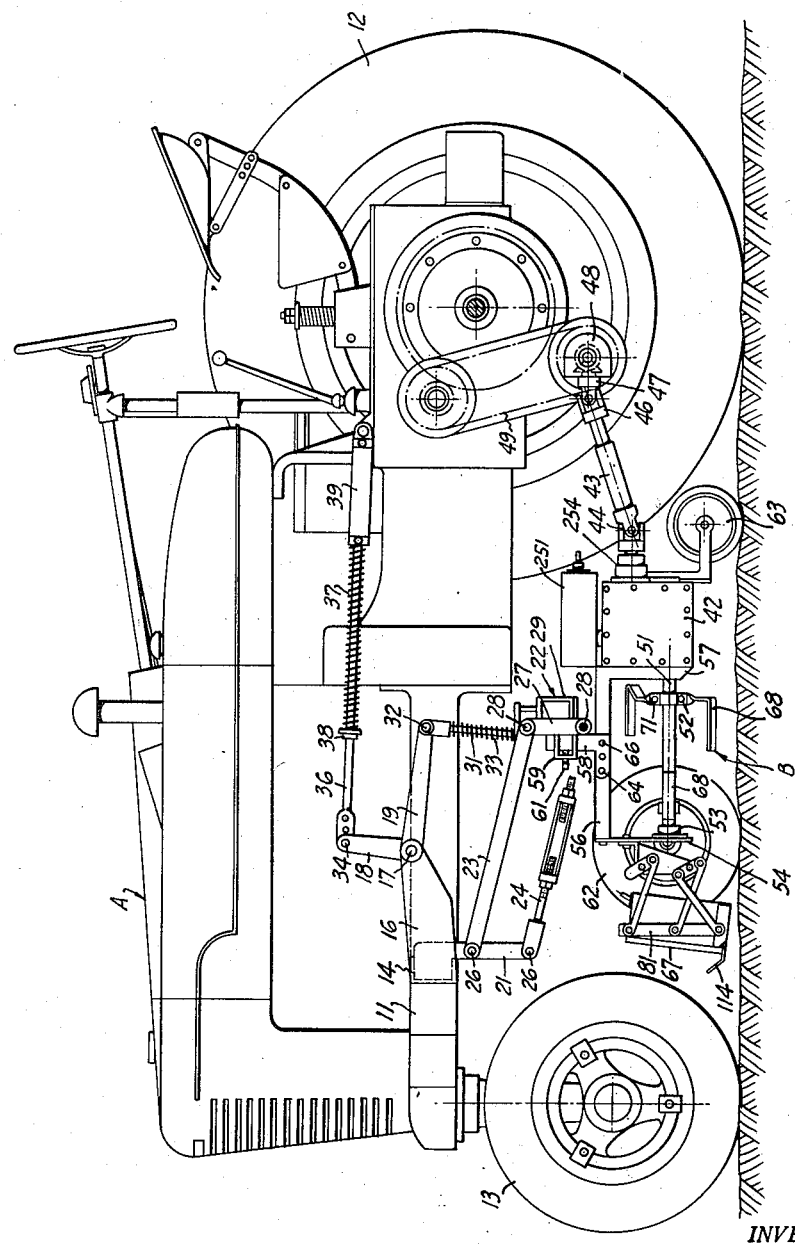
FIG_1
INVENTORS
HAROLD F. ELLIOTT
DAVID R. SCOTT
BY JAMES A. CHESEBROUGH
ATTORNEYS Dec. 16, 1958 H. F. ELLIOTT ET AL 2,864,292
TRACTOR MOUNTED PLANT THINNING MACHINE
Filed Jan. 18, 1956 13 Sheets-Sheet 2
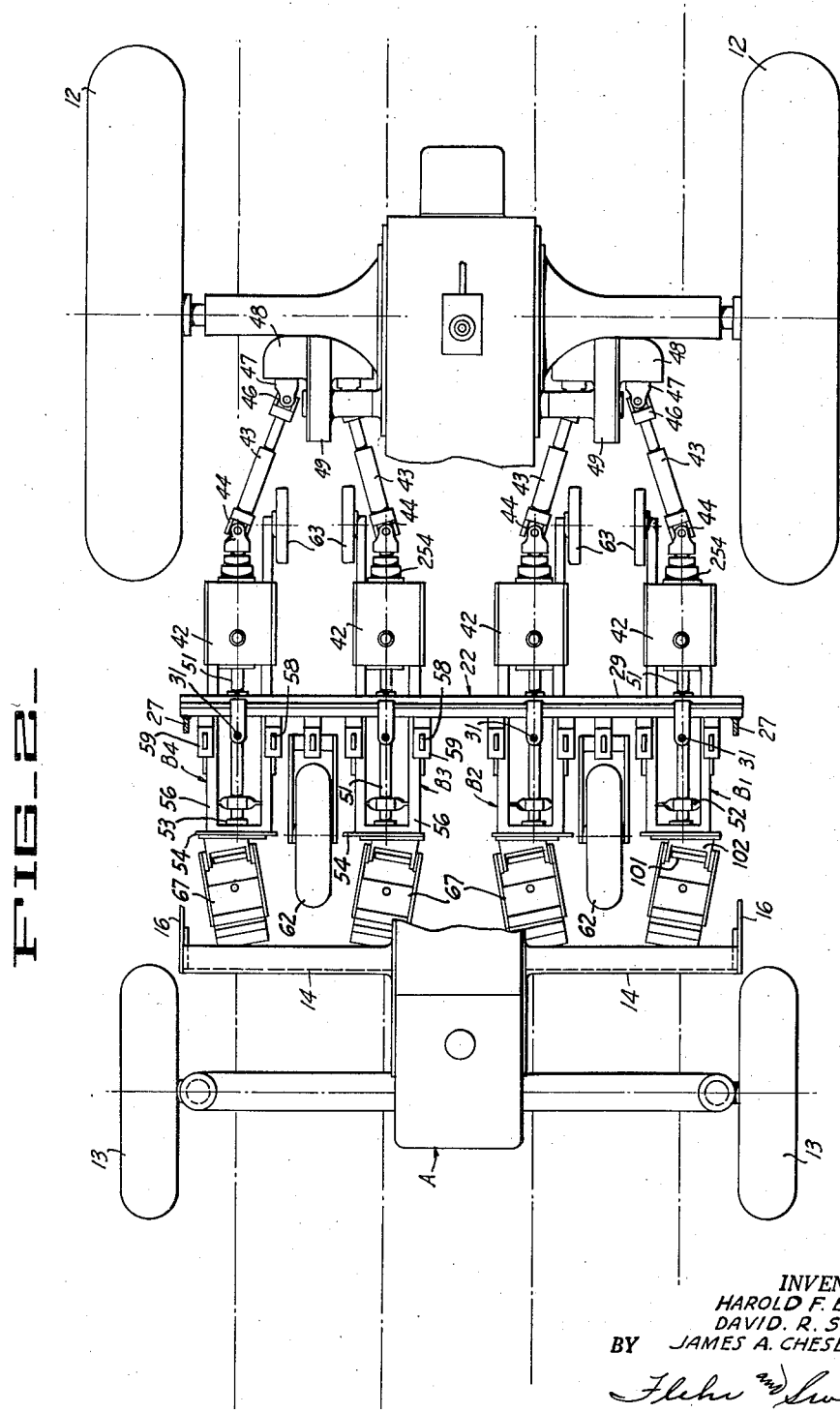
FIG_2_
INVENTORS
HAROLD F. ELLIOTT
DAVID. R. SCOTT
BY JAMES A. CHESEBROUGH
ATTORNEYS Dec. 16, 1958 H. F. ELLIOTT ET AL 2,864,292
TRACTOR MOUNTED PLANT THINNING MACHINE
Filed Jan. 18, 1956 13 Sheets-Sheet 3
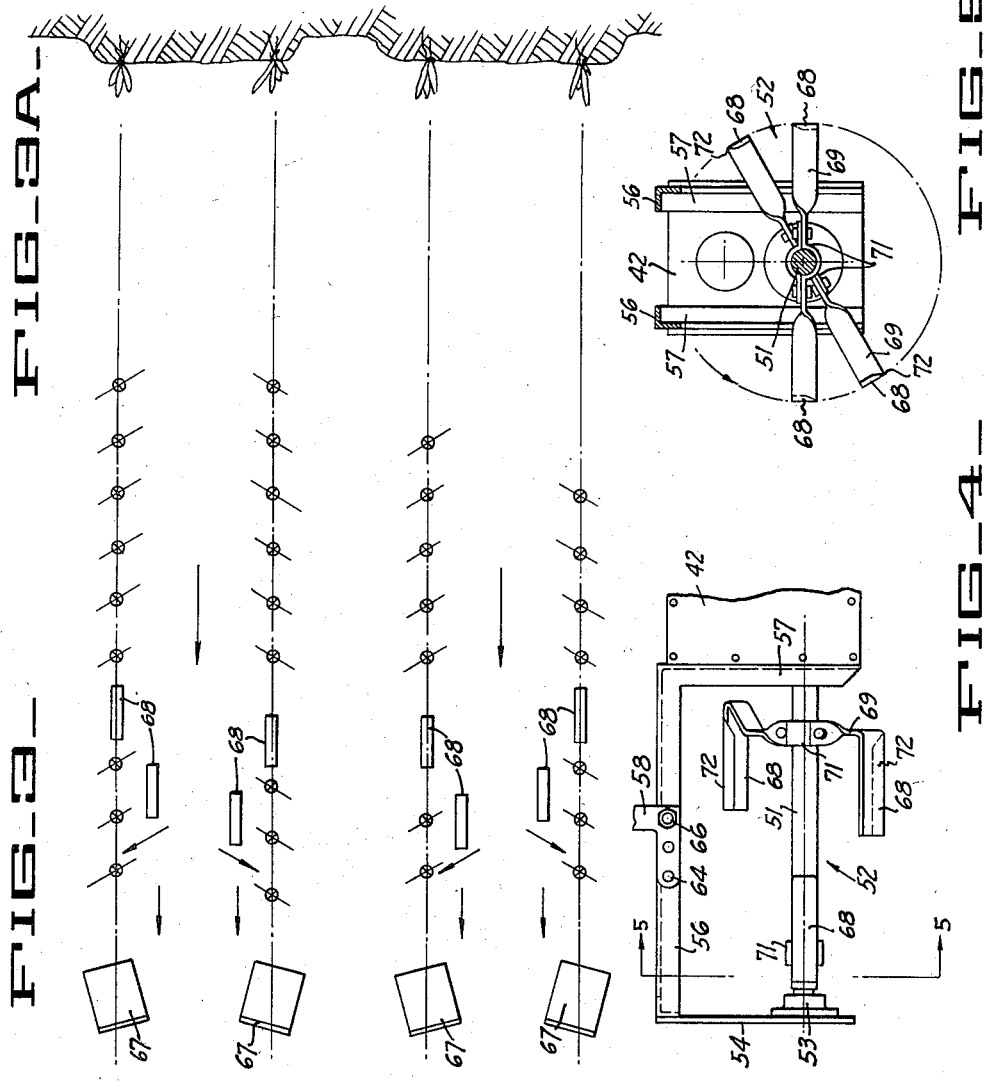
INVENTORS
HAROLD F. ELLIOTT
DAVID R. SCOTT
BY JAMES A. CHESEBROUGH
ATTORNEYS Dec. 16, 1958   H. F. ELLIOTT ET AL   2,864,292
TRACTOR MOUNTED PLANT THINNING MACHINE
Filed Jan. 18, 1956   13 Sheets-Sheet 4
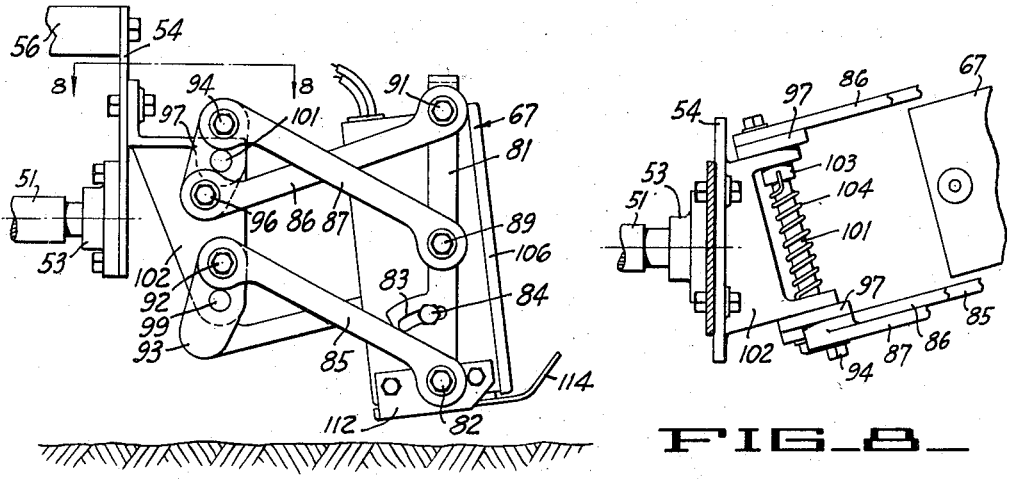
FIG_7_   FIG_8_
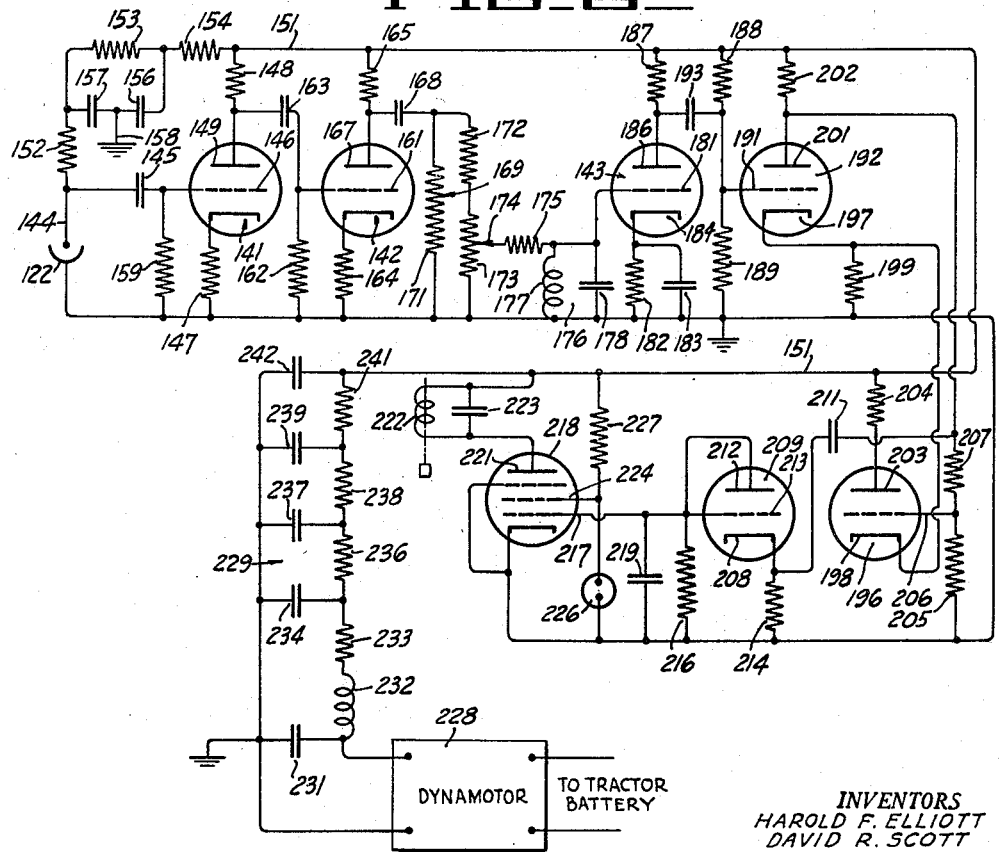
FIG_6_
INVENTORS
HAROLD F. ELLIOTT
DAVID R. SCOTT
BY JAMES A. CHESEBROUGH
ATTORNEYS Dec. 16, 1958     H. F. ELLIOTT ET AL     2,864,292
TRACTOR MOUNTED PLANT THINNING MACHINE
Filed Jan. 18, 1956                    13 Sheets-Sheet 5
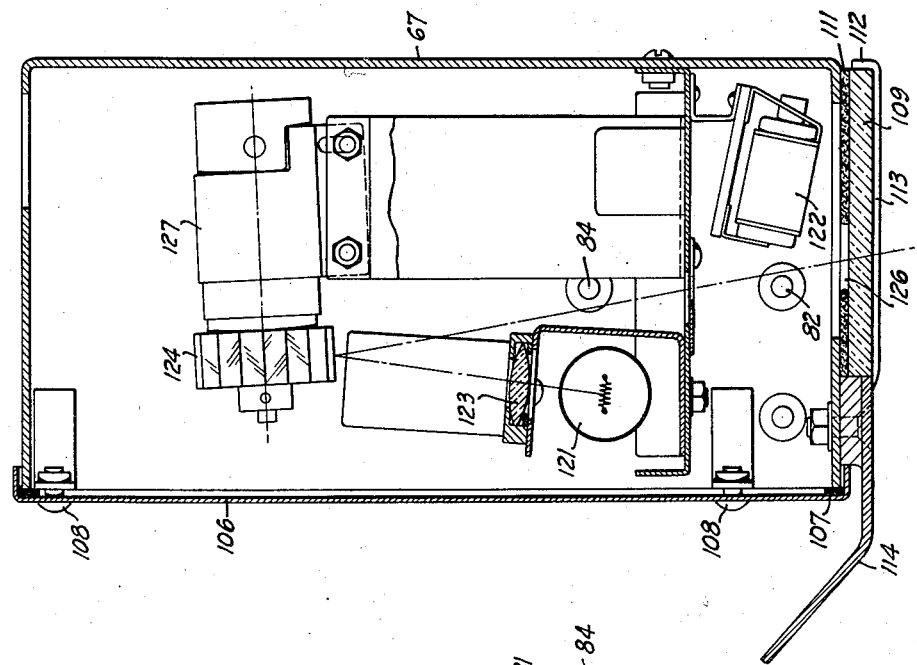
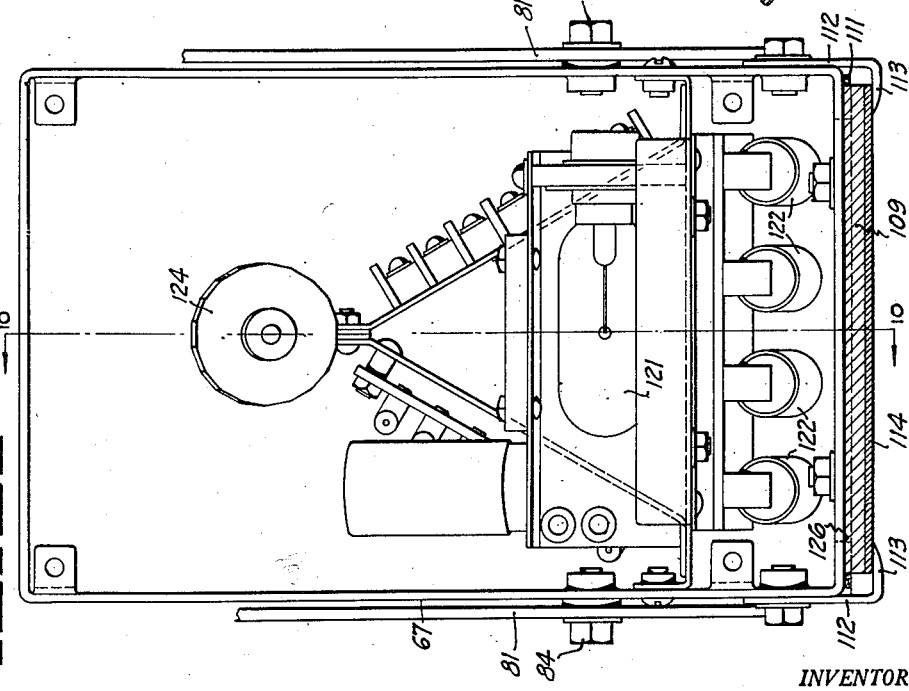
INVENTORS
HAROLD F. ELLIOTT
DAVID R. SCOTT
BY JAMES A. CHESEBROUGH
ATTORNEYS Dec. 16, 1958     H. F. ELLIOTT ET AL     2,864,292
TRACTOR MOUNTED PLANT THINNING MACHINE
Filed Jan. 18, 1956                                           13 Sheets-Sheet 6
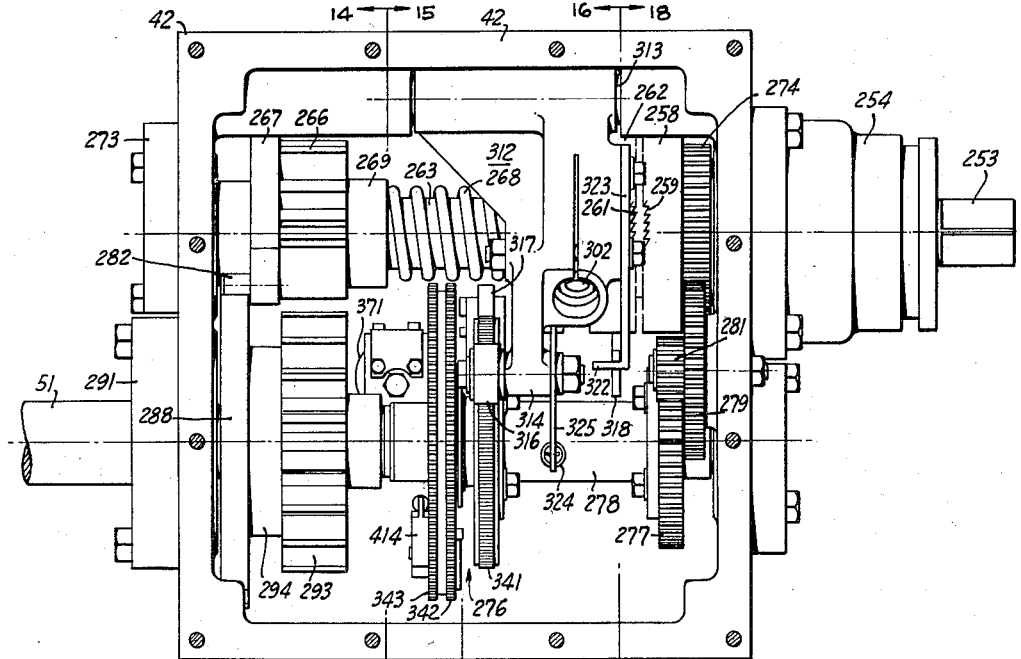
FIG_12
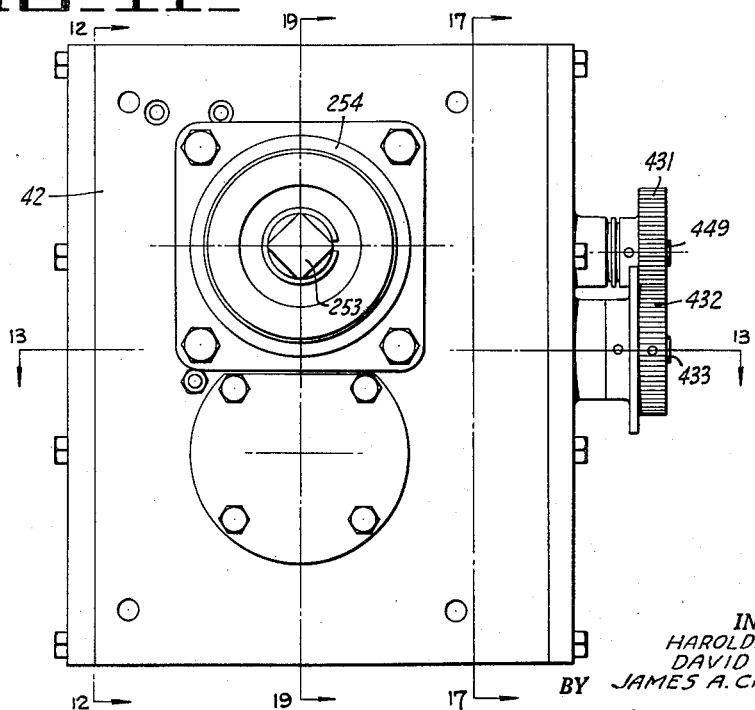
FIG_11
INVENTORS
HAROLD F. ELLIOTT
DAVID R. SCOTT
BY JAMES A. CHESEBROUGH
ATTORNEYS

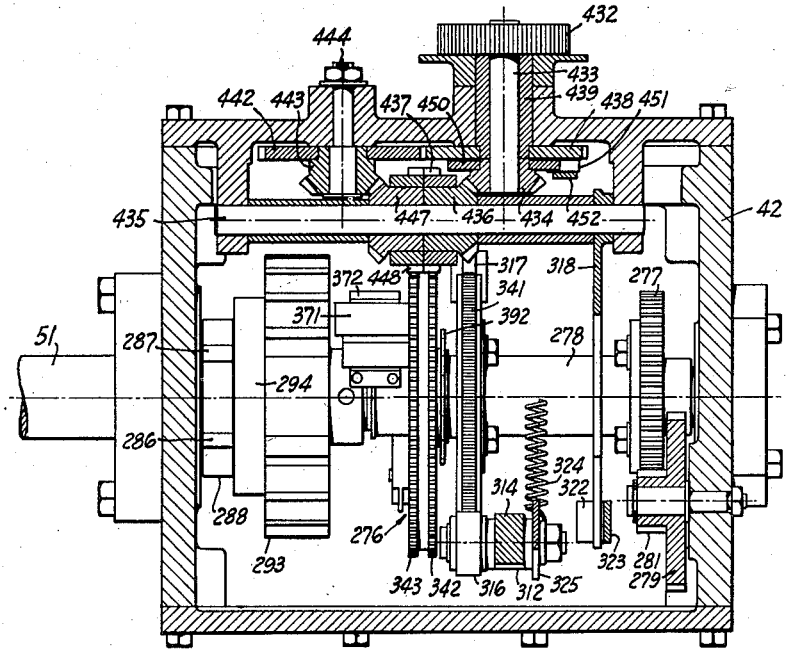
FIG_13_
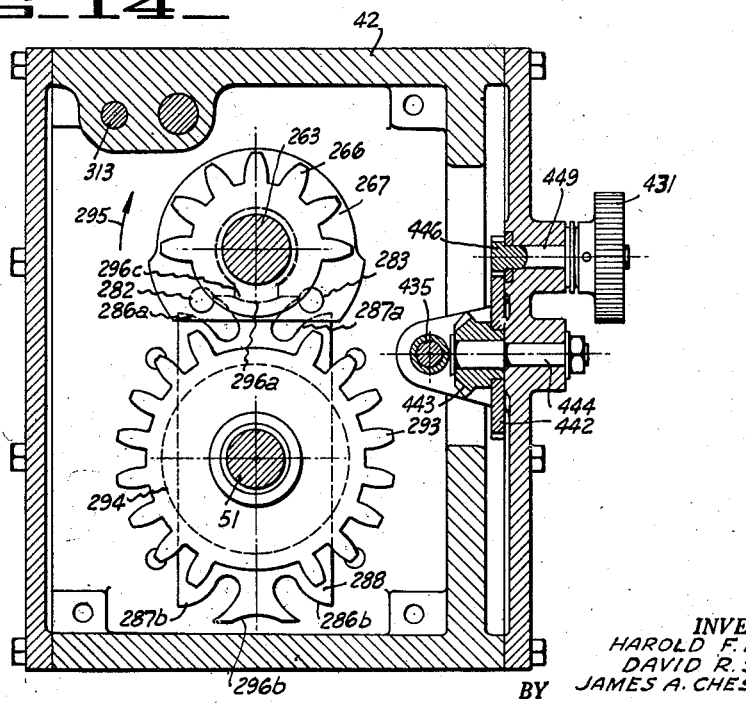
FIG_14_
INVENTORS
HAROLD F. ELLIOTT
DAVID R. SCOTT
JAMES A. CHESEBROUGH
BY
ATTORNEYS Dec. 16, 1958 H. F. ELLIOTT ET AL 2,864,292
TRACTOR MOUNTED PLANT THINNING MACHINE
Filed Jan. 18, 1956 13 Sheets-Sheet 8
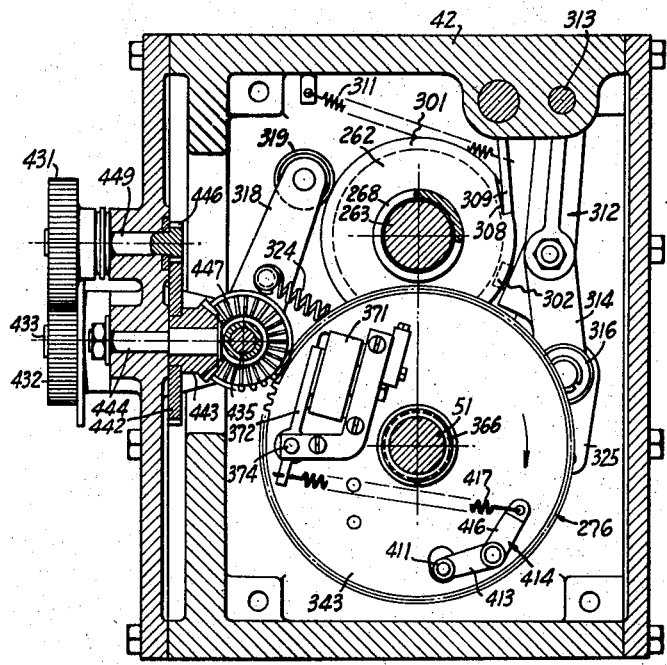
FIG_15_
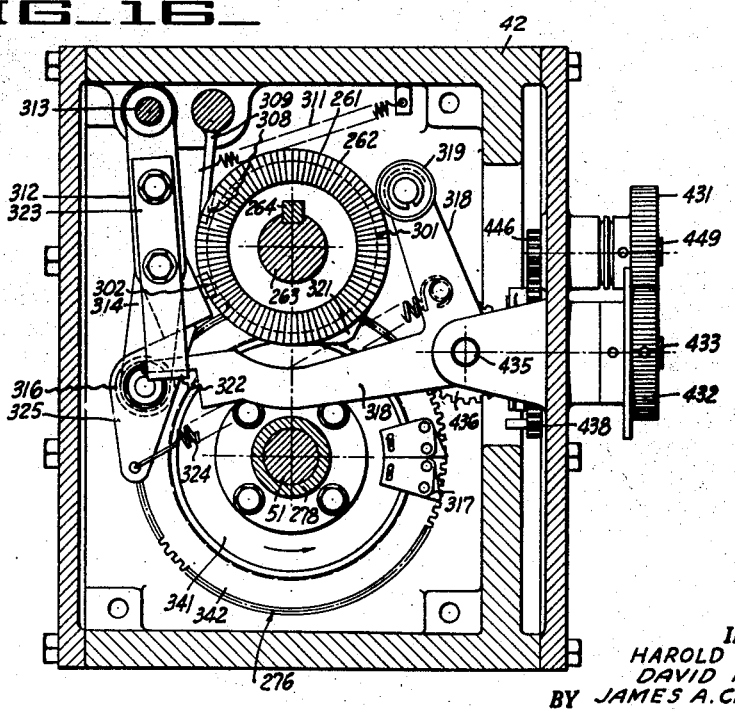
FIG_16_
INVENTORS
HAROLD F. ELLIOTT
DAVID R. SCOTT
BY JAMES A. CHESEBROUGH
ATTORNEYS

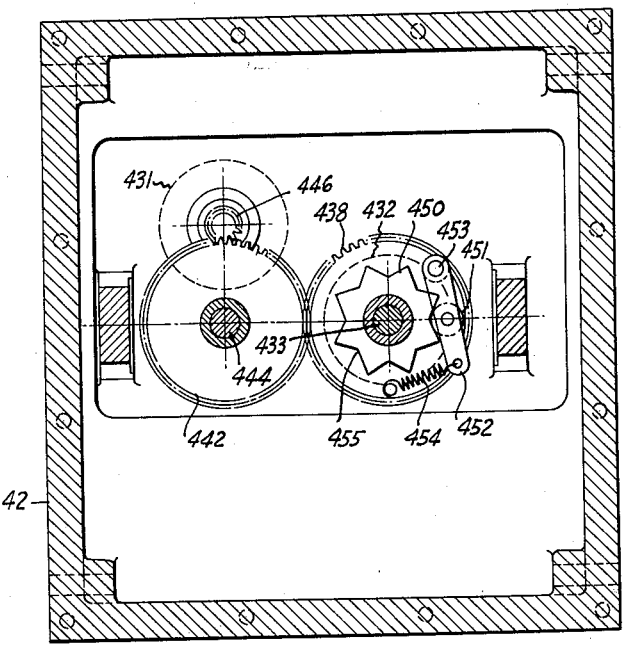
FIG_17_
FIG_18_
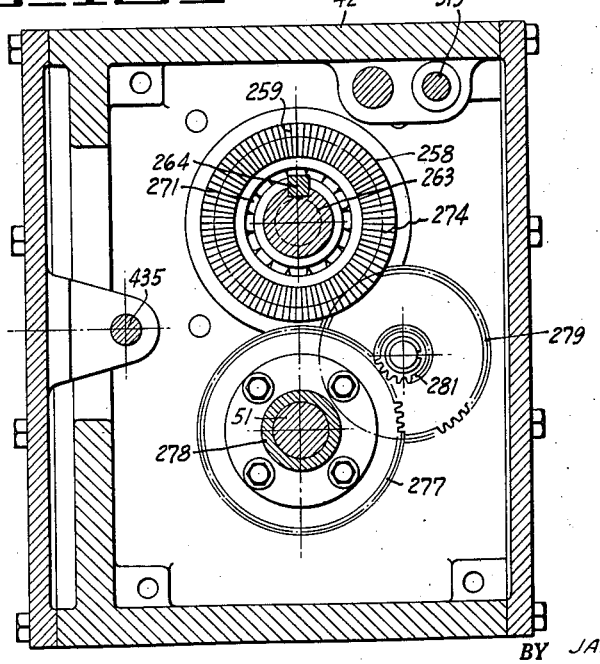

Dec. 16, 1958  H. F. ELLIOTT ET AL  2,864,292
TRACTOR MOUNTED PLANT THINNING MACHINE
Filed Jan. 18, 1956  13 Sheets-Sheet 10
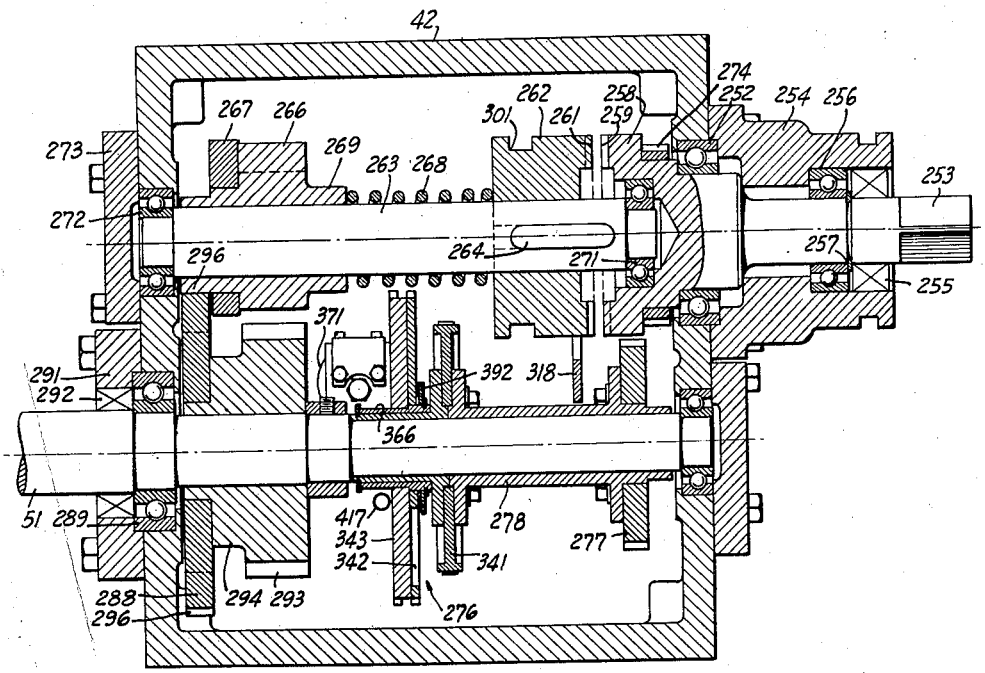
FIG_19_
FIG_20_
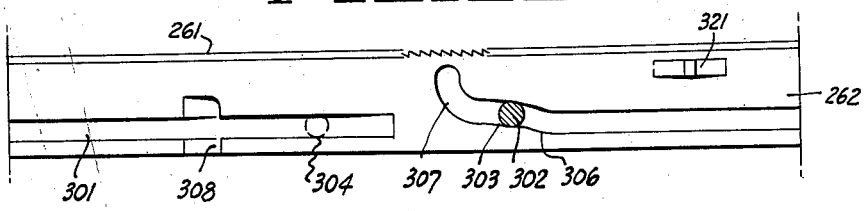
INVENTORS
HAROLD F. ELLIOTT
DAVID R. SCOTT
BY JAMES A. CHESEBROUGH
ATTORNEYS Dec. 16, 1958     H. F. ELLIOTT ET AL     2,864,292
TRACTOR MOUNTED PLANT THINNING MACHINE
Filed Jan. 18, 1956     13 Sheets-Sheet 11
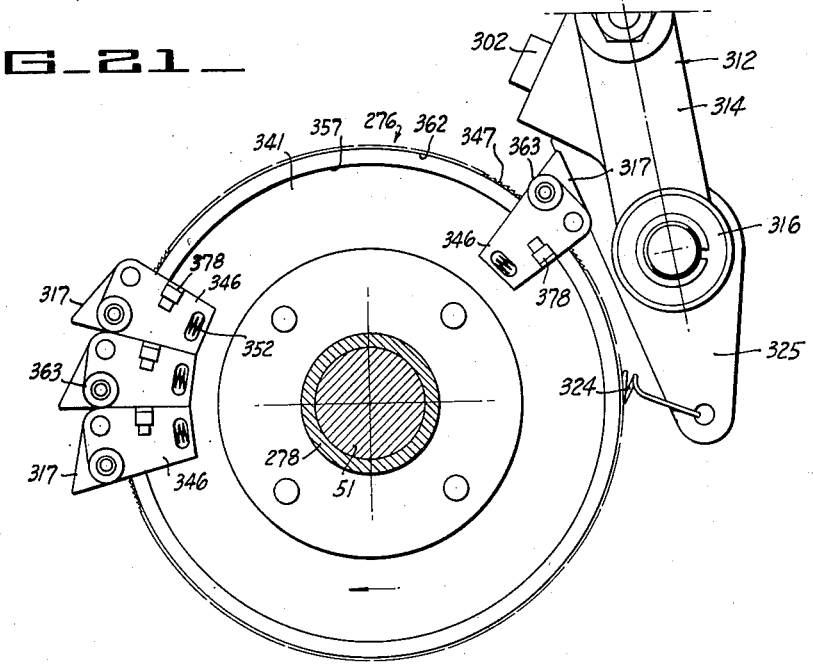
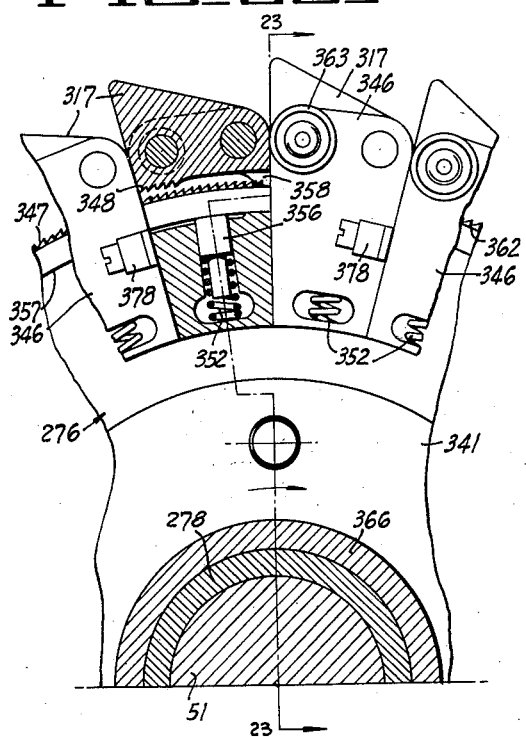
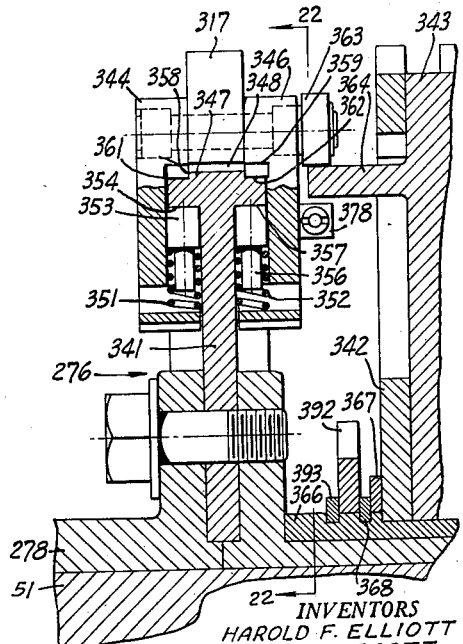
INVENTORS
HAROLD F. ELLIOTT
DAVID R. SCOTT
BY JAMES A. CHESEBROUGH
ATTORNEYS

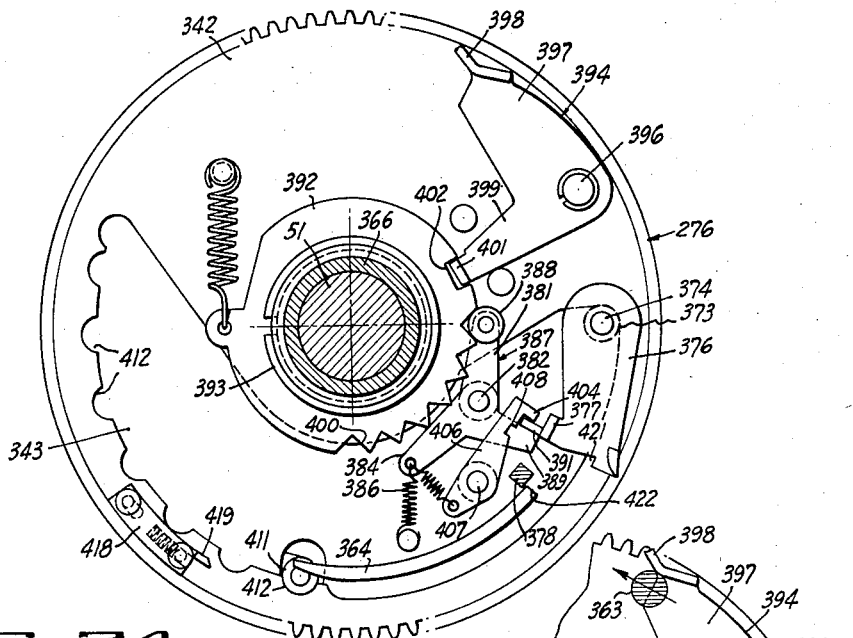

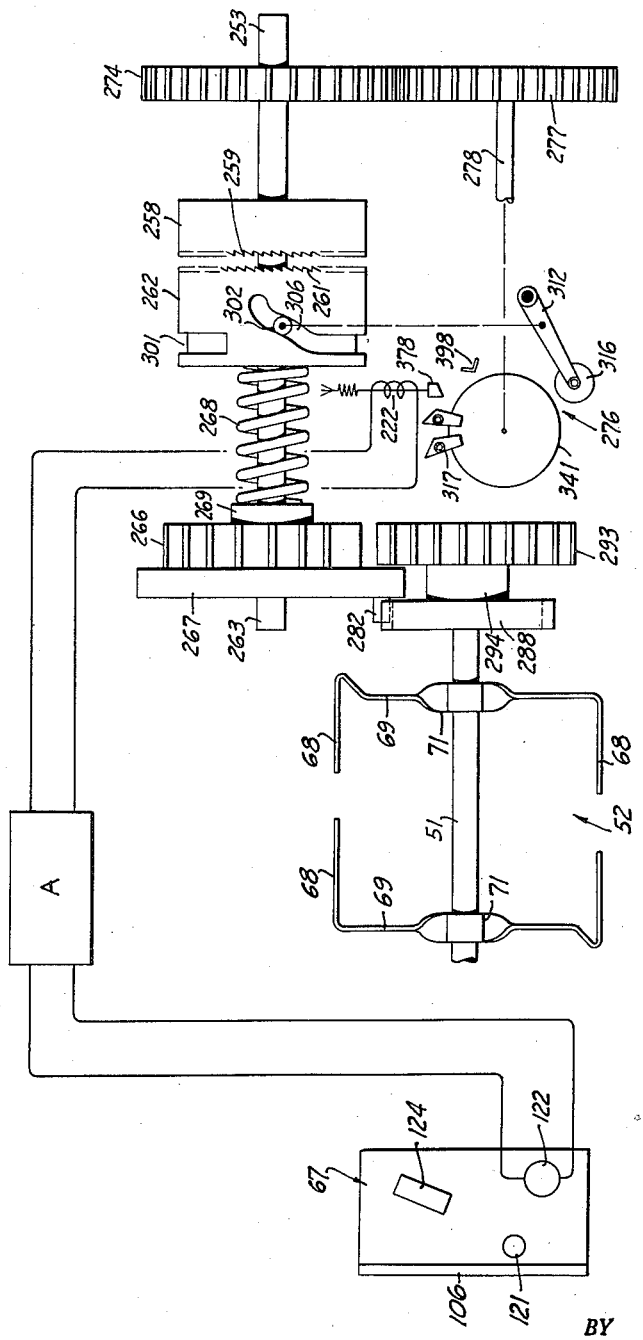

United States Patent Office 2,864,292
Patented Dec. 16, 1958

2,864,292

TRACTOR MOUNTED PLANT THINNING MACHINE

Harold F. Elliott, Menlo Park, David R. Scott, Palo Alto, and James A. Chesebrough, Los Altos, Calif., assignors, by mesne assignments, to Hewlett-Packard Company, Palo Alto, Calif., a corporation of California Application January 18, 1956, Serial No. 559,855

19 Claims. (Cl. 172—6)

This invention relates to agricultural machines of the type in which one or more ground engaging means are automatically controlled, and more particularly to an agricultural machine in which the ground engaging means are controlled by the light sensitive means to selectively operate on a row of plants.

In Patent No. 2,400,562, there is disclosed an agricultural machine making use of a frame adapted to travel along a row of plants. Ground engaging cutters are carried by the frame and are adapted to operate on one or more rows of plants. The cutters are controlled by light sensitive or photoelectric means whereby controlling light responses are secured from plants in the desired condition of growth. In general, machines of the above character can be arranged to perform various functions, including particularly thinning out of plants to leave properly spaced selected plants, and to eradicate weeds as the plants approach maturity. Agricultural machines for the same general purpose are disclosed in Patent No. 2,633,785 and Patent No. 2,700,923.

A timing device for use in machines of the above character is described in Patent No. 2,437,168. The timing device is employed to determine the minimum spacing between plants left standing in a row. The maximum spacing is determined by the frequency with which good plants are encountered. The timing device includes means for introducing a time and/or space delay between the generation of an electrical impulse by the photo sensitive means and the energization of the ground engaging means. Consequently the photoelectric light sensitive device may be placed ahead of the cutters where it is not affected by fragments of the soil and foilage thrown by the cutters or ground engaging means as they engage the ground. The timing adjustment permits adjustment of the forward travel of the ground engaging means after receipt of an impulse and before actuation of the same whereby the desired plant is not eradicated. The timing device is also suitable for controlling the application of weed killers, fertilizers and insecticides.

It is an object of the present invention to generally improve upon machines and methods disclosed in the aforesaid patents.

It is another object of the present invention to provide a machine of the above character which makes use of an improved timer.

It is still another object of the present invention to provide a machine of the above character in which the ground engaging members are controlled with a high degree of accuracy.

Additional objects of the invention will appear from the following description in which the preferred embodiments of the invention are described with reference to the accompanying drawing.

Referring to the drawing:

Figure 1 is a side elevational view illustrating a machine incorporating the present invention;

Figure 2 is a plan view of certain working parts of the machine shown in Figure 1;

Figure 3 is a schematic view illustrating the manner in which the machine operates in a plant thinning operation;

Figure 3A is a side elevational view showing the plant beds with plants schematically illustrated therein and the furrows;

Figure 4 is a side elevational view showing the construction and mounting of suitable ground engaging means or cutters;

Figure 5 is an end view of the cutters of Figure 4 taken along the line 5—5 of Figure 4;

Figure 6 is a circuit diagram illustrating an electrical system which may be used with the photoelectric means;

Figure 7 is an enlarged side elevational view of the photoelectric means incorporated in Figures 1 and 2;

Figure 8 is a plan view of the photoelectric means of Figures 1 and 2 taken along the line 8—8 of Figure 7;

Figure 9 is a front elevational view, with the front cover removed, of a photoelectric unit suitable for use with the machine;

Figure 10 is a partial sectional view taken along the line 10—10 of Figure 9;

Figure 11 is an elevational view of the housing, Figures 1 and 2, which houses the clutch drive means and timing device showing the input shaft and controls;

Figure 12 is a side elevational view of the housing with the cover removed showing the clutch, drive means and timing device for operating the ground engaging means, taken along the line 12—12 of Figure 11;

Figure 13 is a sectional view of the drive mechanism and timing device, taken along the line 13—13 of Figure 11;

Figure 14 is a sectional view showing the drive means, taken along the line 14—14 of Figure 12;

Figure 15 is a sectional view showing the clutch, timing device and controls, taken along the line 15—15 of Figure 12;

Figure 16 is a sectional view showing the clutch, timing device and controls, taken along the line 16—16 of Figure 12;

Figure 17 is a sectional view showing the timing device and controls, taken along the line 17—17 of Figure 11;

Figure 18 is a sectional view showing the timing device and controls, taken along the line 18—18 of Figure 12;

Figure 19 is a sectional view of the clutch, drive means and timing device, taken along the line 19—19 of Figure 11;

Figure 20 is a laid out plan view of the clutch driven member showing the contour of the operating cam;

Figure 21 is an elevational view of the cam assembly of the timing device;

Figure 22 is an elevational view of the cam assemblies and cam carrier, taken along the line 22—22 of Figure 23;

Figure 23 is a sectional view of the cam carrier and cam assemblies, taken along the line 23—23 of Figure 22;

Figure 24 is an elevational view of the lever assembly of the timing device, taken along the line 24—24 of Figure 12;

Figure 25 is an elevational view of the lever assembly of Figure 24 showing the timing device being re-armed;

Figure 26 is an elevational view showing the timing device locked to prevent operation of the cutters of the machine; and Figure 27 is a schematic view illustrating the relationship of the various components described.

The machine illustrated in Figure 1 has its principal operating parts carried by the frame 11 of a farm tractor A. The balloon tired wheels 12 of this tractor are driven and the tractor is steered by turning the front wheels 13. Such a tractor forms a convenient machine for carrying the working parts to be presently described. It will be apparent, however, that other types of tractors can be employed. A special trailer or motor operated wheel frame can be used where it is not desired to adapt the machine for mounting onto a farm tractor.

The frame members 14 which can be in the form of structural steel are attached to the tractor frame 11 and extend outwardly therefrom. Brackets 16 are suitably attached to the ends of the members 14, as, for example, by means of welding. A rod 17 is supported between the member 16 and the frame 11. A sleeve (not shown) is carried by the rod and adapted to rotate on the said rod. An arm 18 is suitably connected to the sleeve. Another arm 19, spaced from the arm 18, is also connected to the sleeve. For example, the arms 18 and 19 may be welded to the sleeve. The arms 18 and 19 form a crank arrangement whereby the associated apparatus may be raised, as will be presently described.

A plurality of members 21 are attached to and spaced along the member 14. A cultivator bar 22 is carried by the members 21. The cultivator bar, which extends across the tractor, serves to carry the operating units designated generally by the reference numeral B, as will be presently described. Parallel links 23 and 24 are pivotally connected at 26 to the member 21. A plurality of plates 27 are suitably spaced along the cultivator bar 22 and suitably connected thereto, as, for example, by welding. The parallel links 23 and 24 are pivotally connected 28 to the plates 27. The length of the link 24 is adjustable wherein the face 29 of the cultivator bar may be maintained substantially perpendicular with respect to the ground surface. The parallel link arrangement supports the cultivator bar 22 in such a manner that it may move in a vertical direction. Angular movement with respect to the vertical or horizontal is prevented.

In order to provide means for raising all of the operating units in unison, the link 31 is pivotally connected 32 to the arm 19. The link 31 is slidably attached (not shown) to the cultivator bar 22 and is spring loaded (spring 33). The slidable spring loaded connection between the link 31 and the cultivator bar allows the cultivator bar to move in a vertical direction as the machine travels along a row of plants. The arm 18 is pivotally connected 34 to the thrust rod 36. At the rear end of the machine, the rod 36 has an operative connection with a suitable operator, such as one of the hydraulic types furnished with tractors. The compression spring 37 urges the thrust rod 36 forward to counterbalance the weight of the operating parts attached to the cultivator bar 22. The spring 37 surrounds the rod 36 and its forward end seats upon the collar 38 which is fixed to the rod 36. Its rear end seats against the hydraulic cylinder 39. It will be understood, of course, that the means just described for elevating and supporting the operating unit is duplicated for both sides of the machine.

Each of the operating units is designated generally by the reference numeral B. The operating units are cyclically driven by a clutch and gear arrangement, to be presently described, which is housed in the housing 42. Power is supplied to the driven element of the clutch by the shaft 43 through the universal joints 44. Each of the shafts is telescopically made with parts which are splined together whereby the shaft is extensible to accommodate shift in the relative position of the operating units B with respect to the frame of the tractor. Each of the shafts 43 has its rear end connected through a universal joint coupling 46 to the stud shaft 47, which is driven by the gearing enclosed within the housing 48. This gearing is driven by a suitable belt 49 which, for example, may be a chain belt and which is driven by the drive which drives the wheels 12.

In general, it is desirable that all the shafts 47 and the extensible shafts 43 be driven at the same speed and in synchronism with the forward movement of the tractor. Since these shafts are driven directly by the drive which drives the wheel, the relative speed of the shafts will be directly dependent upon the speed of the tractor and therefore synchronized with the forward movement of the tractor. The shafts of adjacent pairs of units are preferably driven in opposite directions for reasons which will presently be described.

The shaft 51 is journalled 53 on the plate 54 at one end and on the housing 42 at its other end. The shaft 51 carries the ground engaging means 52. The plate 54 is carried by a U-shaped member 56. The plate 54 may be suitably attached to the member 56, as for example, by bolts or by welding thereto. The main portion of the member 56 extends rearwardly and the portion 57 extends downwardly at right angles thereto. The portion 57 serves to mount the housing 42. A pair of members 56 are associated with each operating unit B. The main portion of each member 56 is engaged by an L-shaped bracket 58. The leg of this bracket passes upwardly through the clamps 59 which are suitably spaced along the cultivator bar 22. Each of the clamps is provided with a bolt 61 which may be tightened to hold the bracket 58 at a predetermined elevation. Thus the height of the members 56 may be controlled by sliding the L-shaped member within the brackets 59.

In order to maintain the operative units B at a suitable elevation with respect to ground level of the row of plants being operated upon, suitable means such as gauge wheels 62 and 63 are provided. The wheel 62 may be adapted to ride in the furrow or adjacent the row of plants as desired, while the wheel 63 is adapted to ride adjacent the row of plants. When the L-shaped bracket 58 is secured at the points 64 and 66, only the rear gauging wheel 62 is employed to control the height of the cultivator bar (the height at which the operative units B are maintained). In other instances, the L-shaped bracket is connected at one point 66 whereby the member 56 is free to pivot about this point. In this instance, both of the gauging wheels are employed; the wheel 62 engages the furrow while the wheel 63 engages the ground next to the row of plants. As the tractor runs along a row, the operative unit is pivoted about the point 66 whereby the cutters 52 maintain a suitable relationship with the ground. Regardless of the particular gauging method employed, the height of the operative units is determined by the contour of the ground.

The box 42 serves to house certain parts including particularly the gearing, clutch and timing mechanism, which serve to drive the cutter shafts through a predetermined angular movement in response to a signal received from the photoelectric means designated generally by the reference numeral 67.

As the machine advances along the plant row, each of the shafts 43 is operated continuously at a speed which is dependent upon the forward movement of the tractor. Each of the shafts 51 is operated recurrently by the clutch, timer and gear means, to be presently described in detail. The ground engaging means or cutters 52 operate upon the ground to perform a thinning, weeding or cultivating operation whereby the sturdy plants in good condition of growth are left standing at suitable intervals. The cutting means 52 may, for example, comprise blades 52 which are carried by the shaft 51. The cutter blades 52 are suitably attached to the shaft 51 to rotate therewith. Means are provided whereby they may be suitably located along the shafts. Each of the ground engaging means 52 may, for example, be L-shaped and formed from flat stock. One leg 68 forms the blade or cutter. The other leg 69 has its end portion twisted through 90° and formed to fit over the shaft 51. These portions are bolted together 71 and engage the shaft 51. The blade or cutter 68 is provided with sharpened edges 72 which face toward the direction of rotation as illustrated in Figure 5. The ground engaging means are spaced apart in the direction of travel as shown in Figures 1 and 4, and are staggered one in front of the other (in the direction of rotation as shown in Figure 5). In general, the rear knife engages the ground first. The arrangement is such that for a given speed of tractor movement and a given speed of blade rotation when the clutch is engaged, the two blades of each pair will operate to eradicate plants or weeds on both sides of the selected plant. The length of the blades in the direction of travel is such that the areas of operation overlap for the minimum spacing determined by the cycle of operation, as will be presently explained.

For example, assuming that the minimum spacing is set for twelve inches, the blades may each measure eight inches in width, with their zone of operation spaced one inch apart, whereby their zones of operation will overlap for the above mentioned minimum spacing. It will be appreciated that the number of pairs of cutting blades may vary in different instances. For example, it is possible to use two sets of cutting blades spaced 180° apart, in which event the clutch is constructed in such a manner that when released it will cause the shaft 51 to be turned through 180°. It is desirable that the ground engaging means be attached to the shaft 51 in such a manner as to afford some adjustment whereby the machine may be adapted for a variety of operating conditions. Also it is desirable that the blades be removable for the purpose of enabling application of different blades or to sharpen the blades. The staggering of the blades one behind the other is desirable in that it tends to avoid clogging between individual blades of a pair, which would tend to result if the blades are set closely together. Further, such staggering prevents tearing out the desired plant as may happen if the blades strike the ground simultaneously.

Assuming that the rows of plants are distributed substantially as shown in Figure 3, with two rows of plants to a bed, and a furrow between the beds, it is desirable that the cutters engage the ground moving in such directions as to displace the dirt and eradicate the undesired plants or weeds into the furrows between the beds. The downward slicing action at the plants helps prevent "tearout" of the desired plants. It is for this reason that the cutters are operated in opposite directions of rotation as indicated, and previously alluded to.

The device 67 (Figure 1) consists of a box which houses the photoelectric cell and source of light. It is carried in advance of the cutters 52 by means which enable individual vertical movement of the same. A U-shaped member 81 (Figure 7) has its depending portions extending along the sides of the box. The ends are suitably secured 82 to the lower portion of the device 67. The slot 83 provides means for adjusting the angular position of the box with respect to the vertical. The bolt 84 which is secured to the bottom portion of the device may be loosened and the angular position of the box changed. The links 85, 86 and 87 are suitably pivoted 82, 89 and 91 respectively to the U-shaped member 81. The link 85 is pivoted 92 upon one end of the arm 93. The links 86 and 87 cross and are pivoted 94 and 96 to opposite ends of the arm 97. Similar links 85, 86 and 87 are disposed and pivoted to the other leg of the U-shaped member 81. On the opposite side a single link 86 is connected to another arm 97, while links 85 and 87 are crossed and connected to another arm 93. The pair of arms 93, 97 are each secured to a shaft 99 and 101 respectively which extend through the member 102. The shaft is provided with a collar 103 to which is attached a torsion spring 104. The torsion spring 104 has its other end attached to the member 102. A turning force is applied through the shafts 99 and 101 which urges the arms 93, 97 to rotate in a direction which counterbalances the weight of the box. The arrangement of the arms 85, 86 and 87, and arms 93, 97 is such that it permits vertical movement of the box but does not permit the box to move in a longitudinal direction as it moves vertically. This is in contrast to parallel movements in which the angle between elements attached to the two ends are maintained constant but in which the horizontal distance between the members varies as the members are moved vertically with respect to one another.

The box illustrated in Figures 9 and 10 is sealed to exclude dust. The box 67 has a detachable cover 106. A suitable rubber gasket 107 is placed between the cover and the box whereby dust is prevented from filtering into the box. The cover is removably clamped in place by means of the screws 108. A glass plate 109 is fitted over the lower open portion of the box. Suitable means such as a soft rubber gasket 111 is placed between the glass plate and the walls of the box to seal the plate. The plate is removably clamped by the side straps 112 which are releasably attached to the side walls of the box, and which have lower inturned edges 113 which underlie the side edges of the plate 109. A runner 114 is shown attached to the forward lower surface of the box. The runner 114 serves to deflect the plants downward whereby they pass underneath the box adjacent the window. Under certain field conditions, a sweep similar to a steel broom is employed in advance of the runner 114 to preposition the plants ahead of the runner.

Mounted above the glass plate and within the box there is a light source 121 and a plurality of photoelectric tubes 122 disposed side by side and facing the window. The photoelectric tubes should have proper spectral characteristics. As is well known the earth absorbs infra-red energy to a high degree while the plants reflect infra-red energy. Thus it is desirable to operate in the near infra-red region of the spectrum. By appropriately choosing the photoelectric means to have a response in this region of the spectrum or by employing suitable color filters, it is possible to discriminate between desired responses obtained from plants such as beets or lettuce, and reflections from the earth which might comprise various types of soils, such as light colored clay, sediment soil, adobe, etc.

The light source 121 may, for example, be an incandescent lamp. The light is focused by the lens 123 onto a rotating mirror holder 124. The rotating mirror holder is provided with a plurality of mirrors having plane faces about its periphery. Thus, as the holder rotates, the spot of light projected by the lens is scanned across the window from one side of the box to the other. The mirrors are so arranged that as one spot is leaving, a new spot is entering. Consequently the surface of the window is continuously illuminated by a constant amount of light. The photoelectric means operate satisfactorily even when the window or associated parts are covered with dust, as will be presently described.

In operating the device, the glass plate 109 passes over the plants and the foilage wipes across the lower surface of the plate. It is a function of the photoelectric means 122 to secure a light response from a plant which is being viewed. The light response is preferably from a part of the plant which is indicative of the location of the central axis of the plant root. We have found that the light responses are indicative of the central axis of the plant root if the light indications are obtained from the bent over stem portions of the plant. By stem portions, we have reference to the portion of the plant near the root which in some plants, may include some foilage, but which is to be distinguished from the main leafy portion of the plant which spreads out over a considerable area.

For accurate indication of plant location, we limit the area from which a light indication can be secured to a relatively narrow zone indicated by a number 126 in Figure 10, which extends in a general lateral direction across box 67. It is desirable that this zone be inclined with respect to the direction of movement of the device along the plant row, and that the direction of extent of the zone be generally parallel to the path taken by the cutter blades as they pass through the earth. This serves the purpose of enabling some misalignment of each device 67 with respect to an associated row of plants without, however, interfering with the accuracy with which the cutters are brought into play to eradicate the plants or weeds from both sides of the plant from which a light response having a predetermined value has been secured.

As is well known, when the light beam strikes the plate 109, a certain amount of light is reflected from the upper and lower glass surfaces. By continuously illuminating the surface of the glass plate with the same amount of illumination, any reflection from the upper surface of the glass plate which has collected dust or any reflections from the lower surface which has been glazed by contact with the earth gives rise to a D.-C. signal from the photo tubes. This signal is not amplified by the A.-C. amplifier, to be presently described, connected to the photo tubes. Since the recurrent spots of light traverse across the opening 126 at a rapid rate of speed, when a plant is located beneath the opening 126 a series of recurrent reflections are obtained from the plant, one reflection for each spot which scans across the opening. These responses are picked up by the photoelectric means and applied to an amplifier which is tuned to the frequency of operation of the rotating mirror 124, and which serves to amplify the impulses and operate the clutch, as will be presently described. The mirror 124 is driven by a suitable motor 127.

The terminals of the photoelectric means 122 are connected with amplifying means (Figure 6) which includes the cascade amplifier comprising vacuum tubes 141, 142 and 143. The plurality of photoelectric tubes are designated by the single tube 122. Conductor 144 is connected to one side of the tube 122 and to the capacitor 145 which couples the tube to the grid 146 of the tube 141. The outer side of the photo tube is grounded. A bias resistor 147 is connected in the cathode lead of the tube 141. A resistor 148 is connected between the plate 149 and the lead 151. Series resistors 152, 153 and 154 are connected between the lines 144 and 151. Series capacitors 156 and 157 are connected in shunt with the resistor 153 and have their common terminal 158 grounded. The grid 146 is connected to ground through the resistor 159.

The grid 161 of tube 142 is connected to ground through the resistor 162 and is coupled to the plate 149 of the tube 141 by the coupling capacitor 163. The bias resistor 164 is connected in the cathode lead 142. The plate resistor 165 is connected between the plate 167 and the lead 151. The capacitor 168 couples the output of the tube 142 to the resistive means 169. The resistive means 169 comprises of resistor 171 connected in parallel with the series combination of resistors 172 and 173. The resistor 173 has an adjustable tap 174 whereby a suitable voltage may be obtained from the voltage divider. As will be presently described, this tap serves to control the size of the plant which will be left standing. The variable tap 174 is resistively connected to the tuned circuit 176 through the resistor 175. The tuned circuit 176 comprises the inductor 177 and capacitor 178 connected in parallel. The value of the inductor 177 and capacitor 178 is so selected that resonant or tuned circuit 176 is resonant at the frequency at which the light beam scans across the opening 126, which, as previously described, is dependent upon the speed of rotation of the mirror holder 124. Thus, the signal which appears across the tank circuit is the A.-C. signal which is generated by the photo tube in response to the recurrent reflections. In one instance the scanning frequency was approximately 1700 cycles per second. Thus the tuned circuit was chosen to be resonant at this frequency. By increasing the speed of the motor, or the number of mirrors, any desired frequency may be obtained.

The voltage appearing across the tuned circuit 176 is applied to the grid 181 of the tube 143. Suitable biasing resistor 182 and by-pass capacitor 183 are connected between the cathode 184 and ground. The plate 186 is connected to the line 151 through the resistor 187. Another voltage divider network which comprises the series resistors 188 and 189 is connected between line 151 and ground. The common junction of the resistors 188, 189 is connected to the grid 191 of tube 192. The common junction is also capacitively coupled 193 to the plate 186 of tube 143.

Operation of the circuit thus far described is briefly as follows: The tubes 141 and 142 act as a cascade untuned amplifier which serves to amplify the recurrent pulses which are generated by the photoelectric tube 122. The amplified voltage is applied to the tuned circuit which serves to discriminate against extraneous signals. The voltage across the tuned circuit is applied to the grid of the amplifier tube 143 which further amplifies the signal. The voltage developed by the tube 143 is applied to the grid 191 of the tube 192 which forms part of the trigger circuit, to be presently described.

The trigger circuit comprises the tubes 192 and 196 which have their cathodes 197 and 198 connected to ground through the resistor 199. The plate 201 is connected to the lead 151 through the resistor 202, while the plate 203 is connected to the lead 151 through the resistor 204. The plate 201 of the tube 192 is connected to the grid 206 of the tube 196 through the resistor 207. Resistor 205 resistively connects the grid 206 to ground. The plate is also capacitively connected 211 to the cathode 208 of tube 209. The tubes 192 and 196 and the associated circuitry form a trigger circuit commonly known as a Schmidt trigger. As is well known, this type of circuit is a form of bi-stable circuit. Tube 196 is normally conducting and tube 192 is normally non-conducting. When the voltage on the grid 191 reaches a predetermined positive value, the tube 192 begins to conduct thereby lowering the plate voltage. The pulse which results is applied to the cathode 208 of the tube 209 and to the grid 206 of tube 196. Tube 196 is cut off. When the voltage on the grid 191 decreases to a predetermined value, the circuit is triggered and reverts to its original state. The increasing positive voltage and the decreasing positive voltages differ by the hysteresis of the circuit.

Tube 209 has its plate 212 and grid 213 interconnected thereby forming a diode. The cathode 208 is connected to ground through the resistor 214. The grid 213 is connected to ground through the resistor 216. The grid and plate are connected to the control grid 217 of the tube 218. A bi-pass capacitor 219 is connected between the grid 217 to cut this tube off, as will be presently described. The tube 218 has its plate 221 connected to the lead 151 through the coil 222 of the electro-magnetic means which forms a part of the timing mechanism, to be presently described. A capacitor 223 is shunted across the coil of the electro-magnetic means. The screen grid 224 is connected to the common terminal of the neon bulb 226 and resistor 227 which are connected between ground and the line 151. The tube 218 is biased whereby it is normally conducting thereby keeping the coil 222 energized. When the Schmidt trigger is triggered, the pulse which is applied through the condenser 211 to the cathode of the diode 209 serves to bias the tube 218 to cut-off. This de-energizes the coil 222 and permits the electromagnetic means to release its armature. When the tube 217 is cut off, the plate 221 rises to a high positive potential, thereby charging the capacitor 223. The capacitor 223 then discharges through the coil 222. The current which flows through the coil 222 is opposite to the normal direction of flow, thereby reversing the magnetization of the electromagnet. This overcomes the residual magnetism and causes the armature to be forced open immediately due to the repulsion between the residual magnetism of the armature and the field generated by reverse current. The resistor 216 and the capacitor 219 are so chosen that the tube 218 remains non-conducting for a period of time which is sufficient for the armature to release.

Plate voltage is supplied to the electronic equipment from the tractor battery. The tractor battery is connected to the dynamotor 228. The filter system which is designated generally by reference numeral 229 serves to filter the output and apply a D.-C. voltage to the circuit. The filter comprises the series combination of inductor 232 and resistors 233, 236, 238 and 241. Capacitor 231 is connected across the output leads. Capacitor 234 is connected between the common junction of resistors 233, 236 and ground, capacitor 237 between resistors 236, 238 and ground, capacitor 239 between resistors 238, 241 and ground, and capacitor 242 between line 151 and ground.

The over-all operation is as follows: The photo tube 122 receives recurrent illumination reflected by a plant. The tube generates a voltage (signal) in response to the illumination. This signal is amplified by the untuned cascade amplifier comprising tubes 141 and 142. The output of the tube 142 is applied to the tuned circuit 176 at the variable tap 174. By adjustment of the position of the tap 174, an adjustment for plant size may be made. The signal appearing across the tuned circuit is amplified by the tube 143 and then supplied to the trigger circuit. This circuit is triggered when the amplified signal has a predetermined amplitude. A pulse is applied to the diode and it conducts to cut off the tube 218. The coil 222 is de-energized. Simultaneously, the plate 221 goes positive thereby charging the capacitor 223 which then discharges through the coil to furnish a reverse current which de-energizes the electromagnet and forces the armature away from the magnet. The resistor 216 and capacitor 219 determine the time during which the tube is non-conducting.

In one particular instance apparatus was constructed for operation at the same frequency as mentioned above, namely 1700 cycles per second, and the various resistors, condensers, inductors and tubes had values as follows: The photo tubes 122 were of the type known by manufacturer's specification as 922, tube 141 was of the type known by manufacturer's specification as 12AY7, tube 142 was of the type known by manufacturer's specification as 12AY7, tube 143 was of the type known by manufacturer's specification as 12AU7, tube 192 was of the type known by manufacturer's specification as 12AU7, tube 196 was of the type known by manufacturer's specification 12AU7, tube 209 was of the type known by manufacturer's specification as 12AU7, tube 218 was of the type known by manufacturer's specification as 6CL6: capacitor 145, .005 mfd.; resistor 147, 1.8 k.; resistor 148, 180 k.; resistor 152, 3 meg.; resistor 153, 2.2 meg.; resistor 154, 2.2 meg.; capacitor 156, .5 mfd.; capacitor 157, .5 mfd.; resistor 159, 3 mg.; resistor 162, 1 meg.; capacitor 163, .005 mfd.; resistor 164, 4.7 k.; resistor 165, 180 k.; capacitor 168, .01 mfd.; resistor 171, 400 k.; resistor 172, 1.2 meg.; resistor 173, 2 meg.; inductor 177, 6 henries; capacitor 178, 2000 µµf.; resistor 182, 2 k.; capacitor 183, .8 mfd.; resistor 187, 180 k.; resistor 188, 3.3 meg.; resistor 189, 820 k.; capacitor 193, .01 mfd.; resistor 199, 120 k.; resistor 202, 12 k.; resistor 204, 120 k.; resistor 207, 120 k.; capacitor 211, .01 mfd.; resistor 214, 1 meg.; resistor 173, 3 meg.; capacitor 219, .01 mfd.; capacitor 223, .01 mfd.; resistor 227, 47 k.; capacitor 231, .003 mfd.; inductor 232, 16 mlh.; resistor 233, 1 k.; capacitors 234, 237, 239 and 242, 20 mfd. each; resistors 236, 238 and 241, 470 k. each.

The electrical components which make up the preamplifier section (tubes 141 and 142) and the associated circuit components are mounted within the box 67 as shown more clearly in Figures 9 and 10. The other components which include the dynamotor, the tuned amplifier, Schmidt trigger and the pentode, which supplies energy to the electro-magnet coil 222 are located in the box 251, Figure 1, which is mounted on the housing 42.

The parts contained within the housing, Figure 1, which include the clutch, timer and gear means, are shown in detail in Figures 11–26.

The rear end wall of the housing 42 is provided with a suitable bearing 252 for the shaft 253 (Figure 19). The seal structure 254 fits over the shaft and is provided with a bearing 256. The ring 257 provides axial thrust to seat the bearing 256 against the structure 254. A suitable seal 255 is housed in the structure 254 to the rear of the bearing. The shaft 253 is suitably attached to the clutch driving member 258, as, for example, by welding. It is, of course, apparent that the driving member and shaft may also be formed as a unitary structure. The end face 259 of the driving member 258 is provided with a plurality of teeth which are adapted to engage mating teeth formed on the face 261 of the driven member 262.

The driven member 262 is adapted to drive the shaft 263 and is mounted whereby it may move in an axial direction with respect thereto. The member 262 may, for example, be keyed as shown 264 (Figures 16 and 19) to the shaft, or a suitable spline connection may be made. The axial movement permits engagement and disengagement of the faces 259, 261 to transmit power from the shaft 253 to the shaft 263. The shaft 263 carries the interrupted gear 266 and the plate 267. The spring 268 is inserted between the driven member 262 and the collar 269 whereby it provides a force which urges the driven member 262 toward the driving member 258 to engage the clutch. One end of the shaft 263 is carried by the bearing 271 which is seated within the driving member 258. The other end of the shaft 263 is journalled on the bearing 272 which is carried by the front wall of the housing 42. A suitable seal 273 is provided to seal the housing.

The driving member 258 carries a gear 274 on its rear portion. This gear is employed to drive the timer, designated generally by the reference numeral 276, through suitable gearing. For example, the gearing may consist of the gear 277 carried by the hollow timer shaft 278. The pair of gears 279, 281 provide a suitable drive between the gear 277 and the gear 274. Thus the gear 279 engages the gear 274 and drives the gear 281 which drives the gear 277. As previously described, the shaft 253 is driven by the shaft 43 through the universal drive coupling 44. The shaft 43 is continuously driven as the tractor moves along a row of plants. The speed of the shaft 43 is dependent upon the forward movement of the tractor. Thus the timer shaft 278 continuously rotates at an angular velocity which is dependent upon the forward movement of the tractor.

Referring particularly to Figures 12 and 14, the plate 267 carries a pair of spaced pins 282 and 283. The pins are adapted to engage the associated cams 286 and 287, respectively. The cams are formed on the plate 288 which is suitably attached to the cutter shaft 51. The shaft 51 (Figure 19) is carried by the front wall of the housing 42 and has a suitable bearing connection 289 therewith. A seal holding plate 291 holds the seal 292 in place to seal the bearing. Spaced rearwardly from the plate 288 is the gear 293 which is also suitably attached to the shaft 51. The space 294 is such that the plate 267 will clear as it is rotated.

Operation of the drive gears is as follows: The cyclic clutch is constructed whereby one cycle of operation turns the shaft 263 through one revolution. Operation of the clutch to achieve this will be presently described. When the shaft 263 turns through one revolution, the associated gear 266 and plate 267 are also turned through one revolution. Assuming the direction of rotation shown by the arrow 295, the pin 283 will engage the cam 287a to turn the plate 288 to drive the shaft 51. The cam is so contoured that the pin 283 slowly accelerates the shaft 51 and gear 293 from a standstill to a velocity which is suitable for the gears to mesh over a small angle of rotation. It has been found that a 17° acceleration period is sufficient to bring the shaft to the required speed without any excessive strain on the associated parts. The required speed is reached when the center of the pin is on the line connecting the centers of the shafts 51 and 263. The pin then rides out of the slot without engaging either surface. When the shaft 51 has been rotated through the predetermined angle, the gear 293 engages the interrupted gear 266 and the shaft 51 is driven by the gears until the pin 282 engages the cam surface 286b. At this instance, the gears are disengaged and the pin acts along the cam 286b to decelerate the shaft 51. This deceleration may be carried out through a similar angle of rotation, for example, 17°. When the shaft has been turned through a prescribed angle, the pin 282 rides out of the cam. Thus, the shaft 263 has turned through one complete revolution while the shaft 51 is turned through 180°. When the shaft 51 has come to rest, the positioning surfaces 296a, 296b formed on the ends of the plate 288 ride into engagement with a mating surface 296c which is carried by the shaft 263. Due to the difference in radii of the surfaces from their axes of rotation, the shaft 51 is locked in a pre-determined position to thereby prevent rotation of the shaft until the next cycle of operation. Thus the surface 296c serves to lock the shaft 51 in a predetermined position when the clutch is disengaged.

The driven member of the clutch has a cam groove 301 formed on its peripheral surface (Figures 19 and 20). In Figure 20, the cam groove is shown in plan view to illustrate a suitable contour over 360° of surface of the driven member 262. The cam follower 302 is adapted to ride in the cam groove. Referring to Figure 20, the cam follower is approximately in the position 303 when the clutch is disengaged and ready to begin the next cycle of operation. When in this position, the cam follower releasably engages the driven member and holds it against the force of the spring to maintain the faces 259 and 261 apart. When the cam follower is released, the spring 268 urges the face 261 against the face 259 to thereby mate the teeth formed on the face thereof and drive the shaft 263. After the driven member has rotated through a predetermined angle, the cam follower is allowed to drop back into the cam groove 301. This angle is enough to engage the cam follower in the neighborhood of the position 304 (Figure 20). In this position the cam follower merely rides in the cam and does not urge the driven member 262 in any direction. The position of the cam follower and cam are axially identical. When the driven member 262 has rotated through an angle of about 355° it begins to ride on the cam surface 306. The driven member 262 is then urged out of engagement and is completely out of engagement when the driven member 262 has rotated to where the cam follower reaches the position 303. Due to the inertia of the associated parts, the driven member will rotate past the 360° mark and the cam follower 302 will ride along the cam up to the position 307. As the cam rides along the cam surface, the spring 268 is compressed. There is a transfer of kinetic energy of translation into potential energy in the spring. The spring then urges the member 262 axially towards the member 258 until the cam follower rides back to the position 303. The clutch remains disengaged and the member 258 is free to rotate until the cam follower 302 is urged out of the cam groove at which time the spring urges the face 261 into engagement with the face 259 to thereby drive the shaft 263 through another cycle of operation.

To prevent the spring from urging the member 262 back into engagement with the member 268, the stop groove 308 is formed on the surface of the driven member. The arm 309 which is suitably pivoted on the housing 42 is adapted to engage this groove and prevent further backward rotation of the driven member 262 whereby it is prevented from engaging with the member 258. The spring 311 urges the arm 309 into engagement.

Any suitable means may be employed for retracting the cam follower 302 from the cam groove 301 and to drop back into the cam groove after a predetermined amount of rotation of the driven member 262. One particular construction of a lever assembly is shown in Figures 12, 15 and 16. The cam follower 302 is carried on the arm 312 which is pivoted 313 to the housing 42. The arm 312 has a portion 314 which serves to carry a roller 316. The roller 316 may be engaged by a suitable tripping mechanism, for example, one of the cams 317, the operation of which will be presently described in connection with the timer. When the cam 317 passes opposite the roller 316, it serves to cam the roller outward thereby disengaging the cam follower 302. To prevent the cam follower 302 from dropping back prior to sufficient rotation of the driven member 262, i. e., for the follower to lie opposite the position 304, the locking arm 318 is provided. The arm 318 carries a roller 319 at one end thereof which rides upon the surface of the member 262. The surface of the member 262 is provided with a projecting cam 321 which engages the roller 319 after a predetermined amount of rotation of the member 262. The lockout latching arm 318 engages the portion 322 of the latch 323 and serves to lock the cam follower 302 out of engagement. When the driven member 262 has rotated through a sufficient angle, the cam 321 engages the roller 319 thereby unlatching the portion 322. When the portion 322 is unlatched, the spring 324 urges the cam follower back into the cam groove. The spring 324 is mounted between the extension 325 of the arm 312 and the leg of the latching arm 318. This spring serves the dual purpose of urging the roller 319 into engagement with the surface of the member 262 and to urge the cam follower 302 into engagement with the cam groove.

A cycle of operation of the clutch is as follows: In its position of readiness, the cam follower 302 releasably engages the cam groove 301 of the member 262 and is in the approximate position 303 (Figure 20). When a cam member 317 passes adjacent the roller 316, the cam follower 302 is cammed out of the groove 301. The member 262 is then urged axially into engagement with the member 258 by the spring 268. During this time the latching member 318 locks the cam follower 302 whereby it may not engage the cam groove after the cam 317 has passed out of engagement with the roller 316. After a predetermined angular rotation of the member 262, the cam 321 engages the roller 319 and the latching mechanism is released whereby the cam follower 302 drops back into the cam and rides therein. After the member 262 has rotated through approximately 355°, the cam begins to ride up the cam surface 306 (Figure 20). This urges the driven member of the clutch 262 in an axial direction out of engagement with the member 258. The kinetic energy stored in the various moving parts is then expended in driving the member 262 past the 360° mark along the cam 307 to compress the spring 268. After the kinetic energy is absorbed by the spring 268, and the member 262 and shaft 263 are stopped, the spring then urges the member 262 back in such a manner that the cam 301 develops a force which rotates the member 262 in a reverse direction until the arm 309 engages the groove 308. The cycle of operation is then completed and the clutch is ready for the next cycle of operation.

While the driving mechanism and clutch described above are desirable and give excellent results, it is to be understood that other conventional types of clutching and driving devices can be used which afford a cyclic operation with a relatively accurate predetermined angular rotation of the shaft 51.

The timing device is shown in Figures 12, 15, 16, and 21–26. Referring particularly to Figure 12, the device is shown mounted in the housing 42. The timing device is designated generally by the reference numeral 276 and is associated with the hollow shaft 278 mounted below the clutch. The cam carrier 341, to be presently described in detail, serves to carry the cam assemblies 317. The carrier 341 is mounted on the hollow shaft and continuously rotates therewith. The minimum spacing wheel 342 is rotatably mounted on the same axis as the shaft 278 as is the travel spacing wheel 343. Operation of these wheels will be presently described in more detail.

Referring now more particularly to Figures 21–23, the cams 317 are shown mounted between the mounting plates 344–346. The cam carrier 341 is provided with teeth 347 on its periphery. The cam member 317 also carries teeth 348 on the rear portion of the bottom surface. The teeth 348 are adapted to engage the teeth 347 in a manner to be presently described. The mounting plates 344 and 346 are U-shaped in section and each is adapted to mount one of the springs 351 and 352. The spring 351 urges the plunger 353 upward on the shoulder 354 of the cam carrier. The reactive force is such that it urges the cam 317 downward to tilt the cam assembly back whereby the teeth 348 are urged into engagement with the teeth 347 unless the assembly is tilted forward out of engagement, as will be presently described. Similarly, the spring 352 urges the plunger 356 against the shoulder 357 to urge the side plate 346 downward. Each of the plates 344 and 346 has a portion 358 and 359 respectively which rides on the shoulder 361 and 362. Thus the cam assembly is pivoted about the point 358, 359 by springs 351, 352 to thereby tilt the assembly to engage the teeth 348.

A roller 363 is mounted toward the rear of the plate 346 of the cam assemblies. The roller 363 is adapted to ride on the ramp 364. When the roller rides up on the ramp 364, the cam assembly is tilted forward thereby disengaging the teeth 347 and 348 and the cam slides under the friction between the shoulders 354 and 357 and the plungers 353 and 356. The ramp 364 is carried by the wheel 343. Referring to Figure 23, the minimum spacing wheel 342 is rotatably carried on the hub 366 and is positioned thereon by means of the washer 367 and lock ring 368. The travel spacing wheel 343 is suitably attached to the hub 366, for example, by welding. The hub 366 is in turn rotatably carried by the hollow shaft 278 as indicated.

Referring particularly to Figure 21, the action of the cam assemblies 317 with respect to the release roller 316 is apparent. The cam assemblies 317 are held stationary one behind the other and are individually released when the coil 222 is de-energized in response to a signal from a plant in the desired condition of growth. The cam then rides under the roller 316 and urges the cam follower 302 out of the cam 301 thereby allowing the driving member of the clutch to engage the driven member and turn the shaft 263 through one revolution. The relative position of the cam assemblies held one behind the other and the roller 316 determines the travel of the machine between the time light is reflected from the plant and the time when the clutch is engaged to actuate the cutters.

As just described, the relative position between the roller 316 which serves to engage the clutch for a cycle of operation and the cam elements 317 which are retained one behind the other by means to be presently described, determines the travel which occurs between a light response from plants in a predetermined condition of growth and the time at which the cutters are actuated to chop, thin, or cultivate the ground between the plants. It is also desirable to provide means whereby the minimum spacing between plants may be controlled. Such means are incorporated in the lever mechanism shown in Figures 24–26. Parts of the lever mechanism are mounted on the minimum spacing wheel 342, while other parts are mounted on the travel spacing wheel 343. The armature 372 is pivoted 373 on the wheel 343. The shaft 374 is secured to the arm 372 and rotates with the arm. The shaft 374 extends through the member 343 and engages the holding lever 376. The holding lever has a stop 377 formed thereon which serves to engage the stop 378 formed on each of the cam assemblies. The relative location of the stops is such that when the coil 371 is energized, holding the arm 372 down, the stops 377 and 378 are in line and the cam assemblies are prevented from rotating with the carrier 341 which is driven by the drive shaft 253. If the lever mechanism is pre-conditioned, as will be presently described, when the coil 371 is de-energized, the stop 377 will move towards the center thereby allowing one of the cam assemblies to fall off the ramp 364, tilt back, lock, and rotate conjointly with the wheel 341. Thus, when the photoelectric means sights a plant in a predetermined condition of growth and the lever mechanism has been pre-conditioned, the coil 371 will release one of the cam assemblies. The cam assembly will then travel to engage the clutch and drive the cutters through a cycle of operation.

The wheel 342 carries a ramp 364 as previously described. As the various cam assemblies rotate in conjunction with the wheel 341 towards the end of their travel, the roller 363 engages the forward portion of the ramp and is lifted against the tension of the associated springs 351 and 352 to tilt the assembly forward. The gears 348 and 347 are disengaged and the cam assembly travels forward under the friction between the plungers 353 and 356 until it abuts against the preceding cam assembly. The cam assembly first in line has its stop 378 engaged with the stop 377 of the cam release lever. The relative distance between the end 422 of the ramp and the abutment is such that the roller lies on the edge of the ramp. Thus when the lever 376 moves to release the cam assembly, it immediately drops down and the teeth are positively engaged whereby it travels in unison with the rotating of the wheel 341.

As previously indicated, the mechanism has an adjustment to control the minimum spacing between plants. This adjustment prevents movement of the arm 376 to move the stop 377 out of line with the stop 378 until the minimum spacing is assured. Operation for minimum spacing is illustrated in Figure 24. A holding lever 381 is pivoted 382 on the member 343. The holding lever has one arm 384 which is spring loaded 386. Another arm 387 carries a roller 388. A third arm 389 has a projection 391 which is adapted to fall below the abutment 377 and thereby prevents the abutment from moving out of line with the abutment 378 to release a cam assembly until the timer is reset.

A reset wheel 392 is held on the collar 366 (Figure 23) by means of the rings 368 and 393. A reset lever 394 is carried by the member 342 and is pivoted at 396. The arm 397 of lever 394 is provided with a projection 398 which is V-shaped in elevation and which serves to engage the rollers 363 of the cam assembly when it travels past. The other arm 399 has a projection 401 which engages the slot 402 formed on the re-arm wheel 392.

Assuming that a plant in the desired condition of growth is sighted by the photoelectric means and that the timing mechanism is reset, then the coil 371 releases the arm 372 and the holding lever 376 rotates to bring the abutment 377 out of line with the abutment 378 thereby releasing one of the cam assemblies. The coil, as previously described, is immediately re-energized, but the armature 372 is re-closed mechanically. The roller 363 immediately passes under the ear 375 on the arm 376, whereby the arm 376 moves to bring the abutment 377 in line with the abutment 378 of the next cam assembly. The lifting of arm 376 by the roller also allows ear 391 to slip under abutment or ear 377, holding the armature 372 closed and establishing the condition for minimum spacing. Thus, if the photoelectric means sights another plant which is in a suitable condition of growth prior to re-arming, another cam assembly cannot be released even though the coil 371 may be de-energized. When the cam assembly has travelled a predetermined adjustable distance, as will be presently described, the roller 363 will engage the projection 398 and pivot the projection outward. This causes the arm 399 to move as shown in Figure 25. This urges the roller 388 upwardly bringing the ear 391 back where it snaps into a locking slot 408. Now, if a plant in the desired condition of growth is sighted, the next cam assembly may be released. When the armature 372 is released and moves arm 376 downward, as shown by the dotted outline 403, it engages the face 404 of the locking lever 406 pivoted 407 on the member 343. This frees the projection 391 from the slot 408 formed on the locking lever. The projection 391 immediately drops into the position shown in Figure 24 where it is ready to drop in under abutment or ear 377 when it is raised.

The wheels 342 and 343 are rotatably mounted with respect to one and other. Thus, by rotating the wheels, the relative position of the reset cam 298 and the release point 377 may be varied. This controls the distance the cam assemblies must travel before the timer is reset.

The roller 411 is adapted to ride into the detents 412 to thereby index the relative position of the wheels 342 and 343. The roller 411 is mounted on the arm 413 of the lever 414 (Figures 15 and 26). The arm 416 is connected to the spring 417. The other end of the spring 417 is connected to the relay arm 372 and serves to urge the arm outward from the relay to thereby release the cam assembly.

In order to permit transmission of power from the reset lever 397 to the arm 387 for any setting of the reset cam, the reset wheel 392 is provided with a plurality of corresponding sawtooth shaped teeth 400. Thus the roller 388 will ride between respective teeth and be cammed thereby.

In certain instances, for example, when transporting the tractor from one location to another, it is desirable to disarm the assembly whereby the ground engaging means will not be operated if plants are observed by the photoelectric means. By rotating the wheel 342 so that the relative position of the wheels is as shown in Figure 26, the timing assembly is disabled. In this position, the roller 411 is located in the detent 412. The lock 418 which is mounted on the member 342 has its projection 419 brought into engagement with the shoulder 421 of the release lever 376. This locks the lever and keeps the abutments 377, 378 in alignment thereby preventing release of a cam assembly.

In general, the clutch, drive means and timing apparatus are all housed within the housing 42 which is then sealed and the various parts immersed in oil. It is therefore desirable to provide means exterior to the housing 42 for adjusting the relative position of the wheels 342 and 343 to thereby adjust the minimum spacing. It is also desirable to provide an external means for rotating both wheels whereby the timing or travel distances of the apparatus may be controlled, that is, the relative angle through which the cam assemblies travel before they engage the roller 316.

The means for externally adjusting the minimum spacing and travel are shown in Figures 11, and 13–16. The knob 431 controls the travel, and the knob 432 controls the minimum spacing. The knob 432 is connected to the shaft 433 which drives the bevel gear 434. The bevel gear 434 engages the bevel gear 436 which is provided with the gear 437 mounted on the cross shaft 435 which engages the gear teeth formed on the periphery of the wheel 341.

The gear 438 is mounted on the concentric shaft 439 which frictionally engages the shaft 433. This gear does not rotate when the knob 432 is rotated because the friction drive is not sufficient to drive the associated gearing. The gear 442 is mounted directly on the bevel gear 443 which is mounted on the shaft 444. The bevel gear 443 engages the bevel gear 447 which has the gear 448 formed thereon and adapted to engage the gear formed on the face of the member 343. The gear 442 is engaged by the gear 446 (Figures 14 and 17) which is driven through the shaft 449 by the timing knob 431. Thus, by rotating the timing or travel knob, the gear 442 and bevel gear 443 are driven. When the gear 442 is rotated, it rotates the gear 438. The friction is such in this instance that the rotation of gear 442 also rotates the gear 438, thus, both of the wheels 342 and 343 are rotated in unison whereby the relative position of the roller 316 and the release point of the cams 317 may be adjusted. This, of course, as has been previously described is the travel adjustment. It is the adjustment of the travel between the sighting of a plant in the desired condition of growth and the time at which the clutch is engaged to drive the ground engaging means.

The minimum spacing knob carries a star-shaped gear 450 which is engaged by the roller 451 carried by the arm 452. The arm 452 is pivoted 453 and spring loaded by the spring 454. Thus, as the spacing knob is rotated, it is indexed. For example, each of the indentations 455 might correspond to a one inch change in spacing. The various indentations 455 on the star wheel 450 correspond to the detents 412 formed on the wheel 343.

Thus, it is seen that means are provided for advancement of wheels 342 and 343 simultaneously to adjust the travel of the apparatus, or to advance the wheel 342 to achieve a predetermined spacing.

Operation of the machine can now be reviewed in conjunction with the diagrammatic sketches shown in Figures 3 and 27 as follows: Assuming that the machine is being operated in a field where plants are arranged in equally spaced parallel rows, the various ground engaging means are arranged to operate accurately upon the respective row of plants. The photoelectric means 67 is adapted to pass over the plants. The angle that the opening 126 makes with the row of plants corresponds to the angle at which the cutter blades cut through the ground due to the forward movement of the machine, as illustrated in Figure 3.

The light from the source 121 is focused on the revolving mirror 124 which then directs it downward to scan the opening 126. The light reflected by the window, plant, etc. is picked up by the photo tubes which develops an output voltage. The output voltage is applied to the A.-C. amplifier. The amplifier, as previously described, is tuned to the frequency at which the light scans across the window and has a plant size adjustment. Assuming that a plant having a predetermined size lies below the window 126, the amplifier will trigger the trigger circuit which in turn serves to cut off the magnet coil 222. The coil 222 releases the armature 372, the arm 376 rotates and the stop 378 is brought out of engagement with the mating stop carried by the timing cam 317. As the machine moves forward, the shaft 253 is continuously rotated. The gears 274 drive the gear 277 which drives the cam carrier 341 which carries the cam assemblies. When the cam member 317 is released, it travels along with the cam carrier 341 through a small predetermined angle, then the roller 363 engages ear 375 lifting arm 376 to hold back the next cam assembly 317. The cam assembly then travels through an angle corresponding to the minimum spacing, and the roller engages the reset lever 398. Until the reset lever 398 is engaged, the stop 378 is locked whereby the next cam 317 may not be released. After the reset lever 398 has been actuated, a cam may be released when a plant in a predetermined condition of growth is sighted by the photoelectric means 42, and the magnet is de-energized. The cam first released continues to rotate with the wheel 341 and engages the roller 316. The roller 316 urges the cam follower 302 out of the cam groove 301.

The clutch member 261 is urged forward under the pressure of the spring 268 to engage the member 258 and be driven thereby. Thus, the shaft 263, gears 266, plate 267 and pin 282 are rotated through one revolution. After the member 262 has travelled a predetermined angular movement, the cam follower 302 is dropped back into the cam groove 301 where it serves to disengage the clutch at the end of one revolution. Rotation of the shaft 263 causes the pin 282 to engage the cam formed in the plate 288. The plate 288 is accelerated through a predetermined angle and then the gears 266 and 293 are engaged. The acceleration is such that upon completion of the predetermined angle, the gear 293 is travelling at the same peripheral velocity of the gear 266 whereby the gears may be engaged without shock to the associated parts. The ground engaging means 52 engage the ground as shown in Figure 3. The rear means engage the ground to the rear of the selected plant, and the forward cutting member then engages the ground in front of the selected plant. Thus, the plant which is sighted through the window by the photoelectric means remains standing while all the other plants along the row are eradicated. In order to adjust the travel between sighting of the plant and engagement of the ground by the ground engaging means, the timing knob is turned. The two blades 68 may be set at different angular positions to give the desired effect when engaging the ground.

The above will make clear the primary features of the invention and the operation thereof. It is evident that the fields in which the machine is to be utilized should be sown in accurately spaced rows, with the rows as straight as possible. When the seeds have germinated and the plants have reached their proper size for thinning, our machine is employed to take the place of the usual hand thinning. The machine is lined upon a row of plants upon which it is to be operated, and the various cutting units are lowered until the gauging wheels engage the ground. The depth at which the cutters are operated is dependent upon the adjustment and size of the ground engaging means themselves. When at rest, the ground engaging means or cutters assume an angular position in which the blades clear the ground. However, when actuated by release of the clutch, the cutting blades rotate to engage the ground. During such rotation two blades pass through the ground one behind the plant and the other in front of the selected plant to eradicate undesired plants. It will be evident that in some instances when the plant is relatively close, more than one plant will be left standing between the zones of operation of the blades. However, such groups can be readily thinned out by a simple manual cleanup operation or by a second machine thinning operation a few days later.

It is also evident that the machine is capable of various setups for different types of plants, and for different types of operations desired on plant rows. For thinning operations, the machine can be used to advantage with a large variety of plants including beets, lettuce, cabbage, broccoli, etc. When the plants have reached a fair degree of maturity, the machine can be utilized to advantage for weeding operations to eradicate weeds between plants. For weeding operations, it may be desirable to introduce suitable color filters or to choose a photo tube having a suitable response, or both, in order to provide proper color discrimination between plants and weeds.

The machine is also capable of being used as a cultivator. Here, as in the weeding operation, the machine will leave the desired plants standing and will serve to cultivate the ground between plants. In this instance, suitable hoeing means may be substituted for the ground engaging means.

The various units can be adjusted closer or further apart to accommodate the machine to plant rows at various distances. The faces of the cutters can be adjusted with respect to angularity and to distance from the axis of rotation to suit the machine to different soil conditions and different types of plants.

The machine is not affected by dust conditions. Partly, this is because the glass plate is continuously wiped by the plant and therefore the lower surface is kept sufficiently clean at all times for transmitting the light. In addition, responses are obtained from portions of the plant which are in contact or in relatively close proximity with the lower glass. The intensity of the light response is critical with respect to the distance of the foilage from the surface of the transparent material and falls at a disproportionate rate as the spacing is increased. This characteristic increases the accuracy of response and aids in discriminating against light reflected from extraneous spaces, such as the surface of the ground. Dust which is collected in the interior of the box 67 does not affect the operation since the illumination of the window is continuous.

Operation of the timer which is provided employs cam means to release the clutch. These cam means positively engage the associated cam carrier and rotate therewith without slippage. The minimum spacing and timing of the apparatus may be controlled by means external to the housing 42. Means are provided for disarming the machine.

Certain subject matter disclosed, but not claimed herein, is being disclosed and claimed in co-pending applications filed simultaneously with this application.

We claim:

1. In an agricultural machine of the character described, a power shaft adapted to continuously rotate as the machine is moved along a row of plants, a clutch having a driving and driven member, said driving member operatively connected to said power shaft, an interrupted gear and pins adapted to rotate with said driven member, a generally horizontal driven shaft, a plate and gear carried by said driven shaft, one of said pins adapted to engage said plate to accelerate the driven shaft when the clutch is engaged, the other to engage the plate and decelerate the driven shaft prior to disengagement of the clutch, said gears adapted to engage after the acceleration and disengage prior to the deceleration to drive the shaft, ground engaging means carried by said driven shaft, and means responsive to a plant in the desired condition of growth for operating the clutch whereby the ground engaging means undergo a cycle of operation.

2. Apparatus as in claim 1 wherein said driven member rotates through an angle of 360°, and wherein said driven shaft is rotated through an angle of 180°.

3. In an agricultural machine of the character described, a power shaft adapted to continuously rotate as the machine is moved along a row of plants, a clutch having a driving and driven member, said driving member operatively connected to said power shaft, a generally horizontal driven shaft, ground engaging means carried by said driven shaft, an interrupted gear and pins adapted to be driven by the driven member, a plate and gear carried by said cutter shaft, said plate adapted to be engaged by one of said pins to accelerate the cutter shaft through a predetermined angle, said gears adapted to be engaged after the cutter shaft has been accelerated, the other of said pins adapted to engage said plate to decelerate the cutter shaft after the gears have been disengaged, photoelectric means carried in advance of said ground engaging means and serving to give an output signal responsive to light responses from plants, a carrier continuously rotating as the machine is moved along a row of plants, a plurality of cam assemblies carried by said carrier and adapted to rotate with the same, means serving to hold said cams stationary one behind the other as the carrier is rotated with respect thereto, electromagnetic means responsive to said output signal and serving to release the first of said cam assemblies, said released assembly then rotating conjointly with the carrier, means adapted to be engaged by the released cam assembly and serving to operate said clutch, means for preventing release of succeeding cam assemblies for a predetermined distance of travel whereby the minimum spacing between plants may be controlled, means whereby the distance between the first of the retained assemblies and the means adapted to be engaged by said assembly and serving to operate the clutch may be controlled whereby a predetermined distance of travel may be introduced between the reception of responses from a plant in a desired condition of growth and engagement of the clutch to operate the ground engaging means.

4. In an agricultural machine of the character described, a power shaft adapted to continuously rotate as the machine is moved along a row of plants, a clutch having a driving and a driven member, said driving member operatively connected to said power shaft, drive means operatively connected to the driven member, ground engaging means adapted to be driven by said drive means, photoelectric means carried in advance of said ground engaging means and serving to give an output signal responsive to light responses from plants, a carrier adapted to continuously rotate as the machine is moved along a row of plants, a plurality of cam assemblies carried by said carrier, each of said cam assemblies provided with a roller and means serving to engage the carrier for conjoint rotation therewith, first and second wheels coaxial and angularly adjustable with respect to the carrier, a ramp carried by said first wheel and serving to engage said rollers to urge the cam assemblies out of engagement with the carrier, means adjacent said ramp for holding said cam assemblies in line one behind the other, electromagnetic means serving to operate said holding means to release the first of said cam assemblies in response to an output signal, means preventing the release of succeeding cam assemblies for a predetermined distance of travel to control the spacing between plants, reset means carried by said second wheel and adapted to be engaged by the released cam assembly and serving to reset the holding means whereby a succeeding cam assembly may be released in response to an output signal, the time delay between release and resetting being controlled by adjusting the relative angular position between said first and second wheels, means adapted to be engaged by said released cam assemblies and serving to operate said clutch, and means for rotating said first and second wheel simultaneously to adjust the distance between the release point and said last named means whereby the ground travel between an output signal and operation of the clutch may be controlled.

5. In a timing device adapted to actuate associated apparatus in accordance with the reception of impulses, a carrier adapted to be moved continuously, a plurality of devices retained on said carrier, each of said devices including means serving to releasably lock the same to the carrier, means for releasably retaining one of the devices against movement conjointly with the carrier whereby the other of said devices are collected and retained in single file behind said one device, means for maintaining said releasable locking means disengaged while a device is being held against conjoint movement with the carrier, said last named means permitting a device to be locked to and to move with the carrier when the device is released in response to an impulse.

6. Apparatus as in claim 5 in which the carrier is provided with a trackway slideably engaged by said devices, each device having limited rocking movement between a forward frictional position and a backward locking position, means for urging the devices toward the forward frictional position of the same whereby the device is frictionally carried by the carrier, and means for urging said devices toward the backward locking position whereby the devices are locked for conjoint rotation with the carrier when they are released.

7. In a timing device adapted to actuate associated apparatus in accordance with the reception of impulses, a continuously moving carrier provided with a trackway, a plurality of devices slideably engaged by said trackway, each of said devices including means serving to releasably lock the same to the carrier, each of said devices having limited rocking movement between a forward frictional position and a backward locking position, means for urging said devices toward the said frictional position of the same whereby they are frictionally carried on the trackway, means for releasably retaining one of the frictionally carried devices against movement conjointly with the carrier whereby the other frictionally carried devices are collected and retained in single file behind said one device, and means carried by each of said devices for urging said devices toward the backward locking position whereby the device is locked for conjoint rotation with the carrier for actuating associated apparatus.

8. In a timing device adapted to actuate associated apparatus in accordance with the reception of impulses, a carrier wheel, a plurality of cam assemblies carried by said wheel, each of said cam assemblies including means serving to releasably lock the same to the wheel, means for releasing said cam assemblies whereby the wheel may move with respect to the assemblies, means serving to releasably hold said cam assemblies stationary and one behind the other, means for operating said holding means in response to the reception of an impulse whereby the first of said retained cam assemblies is released to lock and move with the wheel.

9. Apparatus as in claim 8 including means for locking said holding means whereby a succeeding cam assembly may not be released until said released cam assembly has travelled a predetermined distance.

10. Apparatus as in claim 9 including means adapted to be engaged by said released cam assembly for unlocking said holding means whereby a succeeding cam assembly may be released in response to the reception of the next impulse.

11. In a timing device adapted to actuate associated apparatus in accordance with the reception of signals, a carrier wheel, a plurality of cam assemblies carried by said wheel, said cam assemblies including means for releasably engaging said wheel, means serving to release said cam assembly whereby the wheel may rotate with respect thereto, trigger means adjacent said last named means and serving to hold the assemblies stationary and one behind the other, means serving to operate said trigger means whereby the first of said cam assemblies is released to lock with said wheel in response to the reception of a signal, locking means serving to prevent the release of a succeeding cam assembly for a predetermined angle of rotation of said released assembly, and means adapted to be engaged by said cam assembly and serving to release said locking means whereby the next cam assembly may be released in response to the reception of a signal, said last named means being adjustable whereby the angle through which the cam assembly travels prior to release of said locking means is adjustable.

12. Apparatus as in claim 11 wherein said cam wheel includes a plurality of peripheral teeth, and wherein each of said cam assemblies includes teeth adapted to releasably engage said peripheral teeth whereby said assemblies may be releasably locked to said wheel.

13. In a timing device adapted to actuate associated apparatus in accordance with the reception of signals, a cam wheel having a plurality of peripheral teeth, a plurality of cam assemblies carried by said wheel and each having teeth adapted to engage said peripheral teeth, a first rotatable member coaxial with said wheel and rotatable with respect thereto, a ramp carried by said first member and adapted to engage said cam assemblies to move the same out of engagement with the cam wheel, trigger means carried by said first member adjacent said ramp and adapted to hold the said assemblies stationary and one behind the other, means serving to operate said trigger means whereby the first of said cam assemblies is released, a second member coaxial with said wheel and said first member and rotatable with respect to each, a reset means carried by said second member, locking means carried by said first member and serving to lock said trigger means, said locking means serving to prevent the release of succeeding cam assemblies for a predetermined distance of movement of said released assembly, said reset means adapted to be engaged by the released assembly and serving to operate the locking means whereby the next cam assembly may be released in response to the reception of a signal.

14. Apparatus as in claim 13 wherein means are provided for rotating and indexing said second member whereby the distance travelled by said released assembly prior to engaging the reset means may be controlled.

15. Apparatus as in claim 14 including means for transmitting the motion of the reset means to said locking means for any angular position between said members.

16. Apparatus as in claim 15 including means for adjusting the angular position of the first and second members whereby the distance of travel of said cam assemblies between release and actuation of the associated apparatus may be controlled.

17. In an agricultural machine of the character described, a power shaft adapted to continuously rotate as the machine is moved along a row of plants, a clutch having a driving and a driven member, said driving member operatively connected to said power shaft, means serving to hold said driven member disengaged from the driving member, drive means operatively connected to the driven member, ground engaging means adapted to be driven by said drive means, photoelectric means carried in advance of said ground engaging means and serving to give an output signal responsive to light responses from plants, a carrier continuously rotated as the machine is moved along a row of plants, a plurality of cam assemblies carried by said carrier and adapted to rotate with the same, means serving to hold said cam assemblies one behind the other as the carrier is rotated with respect thereto, electromagnetic means responsive to said output signal and serving to release the first of said cam assemblies, said released assembly then rotating with the carrier and releasing the said driven member holding means whereby the clutch is engaged to drive the ground engaging means, and means for rotating the cam holding means to control the angular distance between said first of the retained assemblies and the means adapted to be engaged by said assembly to operate the clutch whereby the ground travel between the output signal and engagement of the clutch may be controlled.

18. In an agricultural machine of the character described, a power shaft adapted to continuously rotate as the machine is moved along a row of plants, a clutch having a driving and a driven member, said driving member operatively connected to said power shaft, means serving to hold said driven member disengaged from the driving member, drive means operatively connected to the driven member, ground engaging means adapted to be driven by said drive means, photoelectric means carried in advance of said ground engaging means and serving to give an output signal responsive to light responses from plants, a carrier continuously rotated as the machine is moved along a row of plants, a plurality of cam assemblies carried by said carrier and adapted to rotate with the same, means serving to hold said cam assemblies one behind the other as the carrier is rotated with respect thereto, electromagnetic means responsive to said output signal and serving to release the first of said cam assemblies, said released assembly then rotating with the carrier and releasing the said driven member holding means whereby the clutch is engaged to drive the ground engaging means, and locking means for preventing release of a succeeding assembly for a predetermined distance of travel, whereby the minimum spacing between plants left standing may be controlled.

19. In an agricultural machine of the character described, a power shaft adapted to continuously rotate as the machine is moved along a row of plants, a clutch having a driving and a driven member, said driving member operatively connected to said power shaft, means serving to hold said driven member disengaged from the driving member, drive means operatively connected to the driven member, ground engaging means adapted to be driven by said drive means, photoelectric means carried in advance of said ground engaging means and serving to give an output signal responsive to light responses from plants, a carrier continuously rotated as the machine is moved along a row of plants, a plurality of cam assemblies carried by said carrier and adapted to rotate with the same, means serving to hold said cam assemblies one behind the other as the carrier is rotated with respect thereto, electromagnetic means responsive to said output signal and serving to release the first of said cam assemblies, said released assembly then rotating with the carrier and releasing the said driven member holding means whereby the clutch is engaged to drive the ground engaging means, and means for preventing release of a succeeding assembly for a predetermined distance of travel, whereby the minimum spacing between plants left standing may be controlled, and means for rotating the cam holding means to control the angular distance between the first of the retained assemblies and the means adapted to be engaged by said assembly and serving to operate the clutch whereby a predetermined distance of travel may be introduced between the reception of responses from plants and engagement of the clutch to operate the ground engaging means.

References Cited in the file of this patent

UNITED STATES PATENTS

| | | |
|---|---|---|
| 2,437,168 | Marihart | Mar. 2, 1948 |
| 2,475,432 | Marihart | July 5, 1949 |
| 2,633,785 | Marihart | Apr. 7, 1953 |